United States Patent
Aguttes

(10) Patent No.: US 6,844,844 B1
(45) Date of Patent: Jan. 18, 2005

(54) SYSTEM COMPRISING A SATELLITE WITH RADIOFREQUENCY ANTENNA

(75) Inventor: Jean-Paul Aguttes, Toulouse (FR)

(73) Assignee: Centre National d'Etudes Spatiales (FR)

( * ) Notice: Subject to any disclaimer, the term of this patent is extended or adjusted under 35 U.S.C. 154(b) by 0 days.

(21) Appl. No.: 10/019,401

(22) PCT Filed: Mar. 28, 2000

(86) PCT No.: PCT/FR00/01803

§ 371 (c)(1),
(2), (4) Date: Dec. 28, 2001

(87) PCT Pub. No.: WO01/01515

PCT Pub. Date: Jan. 4, 2001

(30) Foreign Application Priority Data

Jun. 28, 1999 (FR) ............................................. 99 08223
Jan. 28, 2000 (FR) ............................................. 00 01130

(51) Int. Cl.[7] ............................................. H04B 7/185

(52) U.S. Cl. ...................... 342/354; 342/352; 342/353; 342/372; 455/13.03

(58) Field of Search ............................... 342/352, 353, 342/354, 372, 375; 455/13.3

(56) References Cited

U.S. PATENT DOCUMENTS

| 4,259,741 | A | * | 3/1981 | Kawai |
| 5,548,292 | A | * | 8/1996 | Hirshfield et al. ........... 342/374 |
| 6,104,911 | A | * | 8/2000 | Dickelman ................. 455/13.1 |
| 6,272,317 | B1 | * | 8/2001 | Houston et al. ........... 455/13.1 |
| 6,301,231 | B1 | * | 10/2001 | Hassan et al. .............. 370/316 |

* cited by examiner

Primary Examiner—Theodore M. Blum
(74) Attorney, Agent, or Firm—Connolly Bove Lodge & Hutz LLP

(57) ABSTRACT

The invention concerns a system comprising a radiofrequency antenna stationed in an orbit around the earth, and illuminating means for transmitting and/or receiving likewise orbiting round the earth located on at least a satellite separate from the one bearing the antenna, the antenna being located in the illuminating field of said means. The invention is characterised in that the antenna is a radiofrequency antenna formed by a mesh generation of tiles and phase-shifting means connected thereto, the signals received by the tiles passing through the phase-shifting means before being assembled on said tiles, said phase-shifting and/or delaying means being capable of diverting the radiofrequency signals corresponding to one or several channels transmitted by the illuminating means to send them to the earth along one or several beams and/or of diverting the radiofrequency signals corresponding to one or several beams transmitted from the earth to send them to the illuminating means along one or several channels.

77 Claims, 3 Drawing Sheets

SYSTEM COMPRISING A SATELLITE WITH RADIOFREQUENCY ANTENNA

SYSTEM COMPRISING A SATELLITE WITH RADIOFREQUENCY ANTENNA

The invention relates to a system comprising a satellite with a radiofrequency antenna.

GENERAL FIELD AND STATE OF THE ART

The invention generally concerns all satellite applications requiring large radiofrequency antennas (telecommunications, radionavigation, listening active or passive RF observation, etc.), whatever the orbit (low or geostationary) used.

A satellite structure has already been proposed in which the radio-frequency antenna is used to act as a radio lens with respect to a radio-frequency transmitting or receiving horn which is also carried by the satellite and which is located at the nadir of said antenna and at a distance from it.

In reception and transmission, the function of the antenna here is to focus the RF signals that it receives, onto the horn or toward the earth.

Such a satellite structure allows high tolerance to deformations of the antenna, provided, however, that the antenna beam remains in a direction close to that of the horn's transmission or reception illumination or that the distance from the source is large compared to the dimensions of the antenna.

It is understood that such a satellite structure is of very limited interest for very large antennas since then the horn must be placed at the end of a very big mast.

DESCRIPTION OF THE INVENTION

One aim of the invention is to propose a satellite system with radio-frequency antenna that is not limited by the size of antenna and that allows high tolerance to deformations.

The solution according to the invention is a system comprising a radio-frequency antenna placed in an orbit around the earth, and illuminating means for transmitting and/or receiving likewise orbiting around the earth located on at least a satellite separate from the one bearing the antenna, the antenna being located in the illuminating field of said means, characterized in that the antenna is a radiofrequency antenna formed of a mesh of tiles, this antenna comprising phase-shifting and/or delaying means connected to these tiles, the signals received by the tiles passing through the phase-shifting and/or delaying means before being retransmitted on said tiles; these phase-shifting and or delaying means being capable of diverting the radio-frequency signals corresponding to one or several channels transmitted by the illuminating means to send them back to the earth along one or several beams and/or of diverting the radio-frequency signals corresponding to one or several beams transmitted from the earth to send them back to the illuminating means along one or several channels.

In this way, the signals are assembled without being centralized in any way in the antenna.

The invention also concerns a system whose illuminating means are borne by at least one satellite substantially in the same orbit as the one bearing the antenna.

The antenna acts as a prism that diverts the signals to provide rather vertical radiation (to the earth) from horizontal illumination (when the illuminating means are substantially in the same orbit).

The invention is advantageously completed by the following different characteristics, taken singly or according to all their possible technical combinations:

the radiofrequency antenna is substantially flat, the signals passing from one face to the other of said antenna and for at least one channel and in one path direction, it corresponds, to a direction of illumination along which the illuminating means transmit and/or receive signals to and from the antenna, a cone of "self-compensation" sightings to and from the earth defined by a. common incidence on the plane of the antenna, called self-compensation incidence (the incidence of a direction being the angle that this direction makes with the normal to the plane of the antenna), the self-compensation sightings being such that the deformations of the antenna transverse to the general plane of the antenna and the attitude errors of the antenna about any axis contained within said plane are substantially without effect on these same signals diverted to or from this self-compensation sighting and of small effect in the neighboring sighting directions;

each tile includes at least a central portion, unique for a given channel and a path direction, connected by grouping and/or splitting means upstream on the path at at least one signal receiving point and downstream at at least one signal transmitting point and means for applying phase-shifting and or delaying between the transmitting and receiving points for ensuring diversion are applied on the central portion with regard to the common delaying and phase-shifting and on the branches with regard to the differential delaying or phase-shifting;

it includes means enabling the phase-shifting and/or delays applied on the different paths to be varied;

at least a part of the connecting means between the receiving point or points and the transmission point or points is common to different channels and means enabling these different channels to be discriminated are disposed at the level of at least one junction between a portion of common path and portions of specific paths;

the antenna includes means for translating the frequency of the signals at the time of their diversion, for at least one channel and one path;

for at least one channel and at least one path, the signals use the same frequency before and after the antenna;

for an illumination direction of at least one channel along which illuminating means transmit and/or receive signals to and from the antenna and at least one path direction, the self-compensation incidence is equal to the incidence of the illumination direction;

for at least one channel and at least one path, the signals use a different frequency before and after the antenna and the translation frequency used does not originate from signals received on one of the faces of the tile;

for an illumination direction of at least one channel along which illuminating means transmit and/or receive signals to and from the antenna and at least one path direction, the cosine of the self-compensation sighting incidence and the cosine of the illumination direction incidence are substantially in the ratio of the central frequencies of the illumination side and earth side channel;

along at least one channel and at least one path, the signals use a different frequency before and after the antenna and the translation frequency originates from an "external" translation signal received by a tile face;

along at least one channel and at least one path, the signals use a different frequency before and after the antenna and the translation frequency results from or is equivalent to two consecutive translations, one of which is called external and whose translation frequency, termed Fe, originates from an external translation signal received by a tile face and the other of which is called internal and which is of translation frequency Fi, is without reference to a signal received by one or other of the tile faces;

the illuminating means comprise a plurality of illuminating sub-assemblies and different signals from the same channel transmitted to the plurality of illuminating sub-assemblies or originating therefrom are divided between the earth and the antenna along a plurality of transmitting and/or receiving beams whose angular geometry seen from the antenna substantially corresponds to the relative angular geometry along which the different sub-assemblies illuminating this channel are seen from the antenna, this geometry being modified by an anisotropy where necessary;

the illuminating means comprise a plurality of illuminating sub-assemblies and, for a given channel for which the antenna implements a translation frequency, the different signals transmitted to the plurality of illuminating sub-assemblies or originating therefrom are divided along a plurality of transmitting and/or receiving beams toward the earth whose angular geometry seen from the antenna substantially corresponds to the relative angular geometry along which the different sub-assemblies illuminating this channel are seen from the antenna, after multiplication of all the angular differences by the ratio of the central frequencies of the illuminating side and earth side channel, this geometry being modified by an anisotropy where necessary;

the external translation signal used along at least one channel is transmitted by the illuminating means and received by the antenna face which is on the illumination side, and in the case where the illuminating means are split into illuminating sub-assemblies, the external translation signal is transmitted by a sub-assembly called a focus, possibly limited to this function;

for an illumination direction of at least one channel, along which illuminating means transmit signals to the antenna while transmitting the external translation signal, the cosine of the self-compensation incidence and the cosine of the illumination direction incidence are substantially in the ratio (f+F−Fe)/f where f is the earth side frequency, Fe is the value of the external translation, and F is the total frequency translation, and in the case where the illuminating means are split into sub-assemblies, the difference in incidence between the illumination in question and the focus is substantially reproduced in the difference between the self-compensation incidences corresponding to the illumination and those that would correspond to the focus, using the multiplying terms (f+F/f) and (Sin($\phi$1)/Sin($\phi$2) where $\phi$1 is the illumination incidence angle of the focus and $\phi$2 the self-compensation incidence angle that would result if the focus transmitted;

Fe and F are of the same sign, i.e. relate to changes of frequency in the same direction;

an external translation signal used along at least one channel in receiving is received by the tile face along which receiving takes place and is transmitted from a ground point called ground focus;

an external translation signal used along at least one channel in receiving is received by the tile face along which receiving takes place and is transmitted by at least a satellite substantially in the same orbit as the antenna and the illuminating means, this satellite being arranged in relation to the antenna on the side opposite the illuminating means, the signal transmitting means being called opposite focus;

for an illumination direction of at least one charinel, along which illuminating means receive signals, the self-compensation incidence angle is substantially equal to $\phi$2+(cos($\phi$2)(f+Fe)−cos($\phi$1)(F+f))/Sin($\phi$2)f where $\phi$1 and $\phi$2 are the angle of incidence of the illumination direction and that of the external translation signal, f the earth side frequency, Fe is the external translation value, and F is the total frequency translation;

Fe and F are of the same sign, i.e. relate to changes of frequency in the same direction;

for at least one channel used in transmitting and in receiving, the frequency Fe is equal to the frequency F for both paths and at least one ground focus is in the neighborhood of a transmission self-compensation sighting corresponding to these illuminating means;

for at least one channel used in transmitting and receiving, the attitude of the antenna, as well as the frequencies Fi and Fe both in transmission and reception, are such that the self-compensation sightings are identical on both paths despite the non-alignment of the opposite focus with the illuminating means used in receiving, or in spite of the distance between the ground focus and the center of the zone to be covered;

for an illumination direction of at least one channel, along which illuminating means receive signals, the translation of frequency Fe is done from the external signal received by the illumination face and the self-compensation incidence is such that cosine ($\phi$2)/cosine ($\phi$1)=(f+Fe+F)/f where $\phi$1 and $\phi$2 are the angle of incidence of the illumination direction and the angle of incidence of self-compensation, f being the earth side frequency, Fe the value of the external translation, F the total frequency translation;

Fe and F are of opposite signs, i.e. the external translation Fe is opposite in direction to the total translation F;

for at least one channel used in receiving |Fe|=|F| and |Fi=2|F|;

for at least one channel used in transmitting and receiving, |Fe|=|F| and Fi|=2|F| for receiving and Fe=F for transmitting and the self-compensation sightings are substantially the same on both paths.

for an illumination direction of at least one channel, along which illuminating means receive signals, the translation of frequency Fe is done from the external signal received by the illumination face and is of the same direction as the total translation F, F=Fe and in which the self-compensation incidence is given by $\phi$2−$\phi$1=−2 cot($\phi$1)F/f where $\phi$1 and $\phi$2 are the angle of incidence of the illumination direction and the angle of incidence of self-compensation, f being the earth side frequency, Fe the value of the translation, F the total frequency translation;

the attitude of the antenna is such that the angular difference between all the possible sightings and the self-compensation sightings are globally minimized;

the attitude and the translation frequency or frequencies Fe or Fi are such that the angular difference between all the possible sightings and the self-compensation sightings are globally minimized;

the attitude and the translation frequency or frequencies Fe or Fi are such that the self-compensation residues are spread over both paths;

the antenna includes means for implementing different frequency translations on the radio-frequency signals transmitted or received along separate channels;

the phase-shifting and/or delaying means are controlled so as to keep the orientation of a beam corresponding to a channel unchanged in the reference frame associated with the antenna in spite of modifications to the orientation of the illumination direction used by the beam in the reference frame associated with the antenna;

the phase-shifting and/or delaying means are controlled so as to keep the orientation unchanged in the reference frame associated with the antenna, of a possibly virtual beam direction corresponding to a possibly virtual illumination direction referenced with respect to the illumination directions of a channel;

the direction of the possibly virtual beam, on which the compensation bears is chosen so as to minimize the maximum angular difference between this beam and the beam or set of beams of the channel and the increment, measured at the wavelength of the central frequency of the earth side channel, between the central points used by the channel is established as a function of this maximum angular difference and the tolerable level of the sub-array lobes accompanying the channel beam or beams;

it includes means for controlling the phase-shifting and/or delaying means so as to keep the direction of at least one beam of at least one channel unchanged in the earth reference frame in spite of modifications in the attitude of the antenna and modifications that result therefrom concerning the orientation of illumination directions in the reference frame associated with the antenna.

the satellite bearing the antenna and at least one satellite bearing the illuminating means include means for determining the orientation of the illumination direction in the reference frame associated with the antenna;

the satellite bearing the antenna and at least one satellite bearing the illuminating means include means for determining the orientation of the axis joining them, in the earth reference frame;

the orientation of the illumination direction in the reference frame associated with the antenna is determined based on knowing the attitude of the antenna and the orientation of the axis joining them, in the earth reference frame;

the antenna includes means for comparing the phases and/or delays of at least one signal transmitted by the illuminating means and received at different points of the antenna and means for determining according to this comparison the orientation of the direction of arrival of the signal or signals, in the reference frame associated with the antenna;

the yaw and/or pitch attitude of the antenna is determined based on knowledge of the orientation in the antenna-related reference frame of the direction of arrival of the signal or signals and of the orientation in the earth reference frame of this arrival direction;

a satellite bearing illuminating means includes means for being located or means of receiving radiolocation signals, as well as means for transmitting the location information or the radiolocation signals that it receives to the satellite bearing the antenna, the latter including means for determining primarily according to this information the orientation of the axis joining the two satellites, in the earth reference frame.

the referenced virtual illumination direction is that of an illuminating sub-assembly, which transmits the measurement signal, and the measurement immediately gives the information needed for compensation;

illuminating sub-assemblies are on the same satellite;

illuminating sub-assemblies are offset from one another in a common orbit;

orbits of illuminating sub-assemblies have differences in ellipticity and/or orbital plane;

on a central portion delay, everything is routed to at least one channel and the translation line, or a reference enabling it to be created, used for reducing the frequency of the channel or channels downstream of the delay, so as to limit the impact of delay imperfections on the phase of the diverted signal;

downlink translation is implemented on one channel or several channels upstream of the central portion delay;

such a downlink translation is followed by an uplink translation after the delay using a reference not having suffered this delay, so as to limit the impact of delay imperfections on the phase of the diverted signal;

the delay on the central portion is common to at least two channels on at least one path direction;

the frequency translation is implemented, on at least one channel and one path, in the central portion;

in one telecommunications transmission application, it comprises a plurality of channels, together with a plurality of illuminating sub-assemblies, the beam mosaic on the ground consisting of the fine pattern generated by the antenna due to the angular geometry along which the illuminating sub-assemblies are seen by it, repeated along a wide pattern that is generated by the antenna due to the different channels;

the illuminating sub-assemblies illuminating the same channel are seen from the antenna according to a relatively stable angular geometry except for a rotation about itself at the orbital period and the plurality of directions ensured by the wide pattern of the channel precesses thanks to the phase-shifting and/or delaying means around a central direction and this in phase with the rotation of the fine pattern so that the mosaic of all the beams keeps a stable structure, apart from a rotation about itself on the orbital scale;

the orbit of the satellites is a low orbit and the antenna extends substantially in a plane that passes through the center of the earth, in that an offset of the plane in relation to the orbital plane enables illumination on one face, in that on the other face at least one of the beams is realigned to see the earth;

the phase shifts and delays are such that the offset of the illuminating sub-assemblies is expressed by beams with ground footprints offset transversely with respect to the track;

at least two antenna satellites use common illuminating means;

at least two antenna satellites are located on the same side, along the orbit, of the illuminating means, and are offset on the same orbit or are offset in ellipticity and/or orbital plane;

at least two antenna satellites are on each side of the illuminating means;

one antenna satellite bears illuminating means for another antenna satellite;

one prism satellite bears illuminating means for another prism satellite and is illuminated by illuminating means borne by a prism satellite;

the axis normal to the antenna is substantially in the orbital plane, the pitch being such that the self-compensation sighting cone meets the earth along a self-compensation line globally stretching transversely to the orbit and the ground displacement, substantially along the projection of the orbit, of the line of self-compensation is created by the displacement of the satellite and/or by the change in pitch of the antenna axis and/or the change in translation frequency in the case where this is ensured at least by an internal signal, these three means being able to be used separately or in combination;

the ground sightings are spread in a swath along the line of self-compensation in such a way that the antenna's deformation constraints are very relaxed;

illuminating means receive signals directly from the earth also received via the antenna and a correlation between the two incoming signal paths makes a sighting discrimination of the source of these signals as a function of the angle that the direction of arrival of the signals makes with the antenna/illuminating means axis;

the displacement on the ground, substantially along the orbit's projection, of the sighting zone discriminated by correlation is achieved by the displacement of the satellite and/or by changing the angle of discrimination;

the antenna presents a larger dimension in one direction than in the other directions, which for at least one beam ensures the narrowness of the footprint on the ground in a direction transverse to the orbit;

ground imaging along two cross components is obtained by combining the correlation and a beam scan;

it includes means for performing ground sightings based on an electronic scan of a beam according to a monodimensional control and the large dimension of the beam footprint, which results from the small dimension of the antenna, is along the orbit and enables the coverage of the self-compensation line for all positions of the beam, in spite of the curvature of this line and the mono-dimensional nature of the scanning control;

the antenna is extended along the pitch axis;

the antenna is extended along the yaw axis;

the antenna has means for measuring or reconstructing the deformation ($\Delta P$) transverse to the plane of the antenna;

the antenna includes means for comparing the phases and/or delays of at least one signal transmitted by the illuminating means and received at different points of the antenna and means for determining according to this comparison the deformation ($\Delta P$) transverse to the plane of the antenna;

for an illumination direction of at least one channel along which illuminating means transmit and/or receive signals to and from the antenna and at least one path direction, a deformation correction is made by variation of the phase-shift value $\Delta P(2\Pi f/C)(\cos(\phi 2)-\cos(\phi 1))$ in at least one of the central portions, where $\phi 1$ is the angle of incidence of illumination, $\phi 2$ is that of the sighting direction, f is the earth side and illumination side frequency, and $\Delta P$ is the transverse deformation value at each of the central portions;

for an illumination direction of at least one channel along which illuminating means transmit and/or receive signals to and from the antenna and at least one path direction, a deformation correction is made by variation of the phase-shift value $\Delta P(2\Pi/C)(f2\ \cos(\phi 2)-f1\ \cos(\phi 1))$ in at least one of the central portions, where $\phi 1$ is the angle of incidence of illumination, $\phi 2$ is that of the sighting direction, f2 and f1 are the earth side and illumination side frequencies, and $\Delta P$ is the transverse deformation value at each of the central portions;

for an illumination direction of at least one channel, along which illuminating means transmit signals to the antenna, a deformation correction is made by variation of the phase-shift of $\Delta P(2\Pi/C)(f\ \cos(\phi 2)-(f+F)\cos(\phi 1)+Fe\ \cos(\phi 1))$ in at least one of the central portions, where f is the earth side frequency, Fe is the measured external translation value of the same sign as F if the frequency changes are in the same direction, F is the total frequency translation, $\phi 1$ is the angle of incidence of illumination, $\phi 2$ is that of the sighting direction, $\phi'1$ is that of the focus direction, $\Delta P$ is the transverse deformation value at each of the central portions;

for an illumination direction of at least one channel, along which illuminating means receive signals, a deformation correction is made in at least one of the central portions by variation of the phase-shift of $\Delta P(2\Pi/C)(f\ \cos(\phi 2)-(f+F)\cos(\phi 1)+Fe\ \cos(\phi'1))$, where f is the earth side frequency, Fe is the measured external translation value of the same sign as F if the frequency changes are in the same direction, F is the total frequency translation, $\phi 1$ is the angle of incidence of illumination, $\phi 2$ is that of the sighting direction, $\phi'1$ is that of the focus direction and $\Delta P$ is the transverse deformation value at each of the central portions;

for an illumination direction of at least one channel, along which illuminating means receive signals, a deformation correction is made in at least one of the central portions by variation of the phase-shift of $\Delta P(2\Pi/C)(f\ \cos(\phi 2)+Fe\ \cos(\phi'2)-(f+F)\cos(\phi 1))$ where f is the earth side frequency, Fe is the measured external translation value of the same sign as F if the frequency changes are in the same direction, F is the total frequency translation, $\phi 1$ is at the angle of incidence of illumination, $\phi 2$ is that of the sighting direction, $\phi'2$ is that of the ground focus or opposite focus direction and $\Delta P$ is the transverse deformation value at each of the central portions;

the antenna has means for measuring or reconstructing the deformation ($\Delta P$) transverse to the plane of the antenna;

the antenna includes means for comparing the phases and/or delays of at least one signal transmitted by the illuminating means and received at different points of the antenna and means for determining according to this comparison the deformation ($\Delta P$) transverse to the plane of the antenna;

for an illumination direction of at least one channel along which illuminating means transmit and/or receive signals to and from the antenna and at least one path direction, a deformation correction is made by variation of the phase-shift value $\Delta P(2\Pi f/C)(\cos(\phi 2)-\cos(\phi 1))$ in at least one of the central portions, where $\phi 1$ is the angle of incidence of illumination, $\phi 2$ is that of the sighting direction, f is the earth side and illumination side frequency, and $\Delta P$ is the transverse deformation value at each of the central portions;

for an illumination direction of at least one channel along which illuminating means transmit and/or receive signals to and from the antenna and at least one path direction, a deformation correction is made by variation of the phase-shift value $\Delta P(2\Pi/C)(f2\ \cos(\phi 2)-f1\ \cos(\phi 1))$ in at least one of the central portions, where $\phi 1$ is the angle of incidence of illumination, ϕ2 is that of the sighting direction, f2 and f1 are the earth side and illumination side frequencies, and ΔP is the transverse deformation value at each of the central portions;

for an illumination direction of at least one channel, along which illuminating means transmit signals to the antenna, a deformation correction is made by variation of the phase-shift of ΔP(2Π/C)(f cos(ϕ2)−(f+F)cos (ϕ1)+Fe cos(ϕ'1)) in at least one of the central portions, where f is the earth side frequency, Fe is the measured external translation value of the same sign as F if the frequency changes are in the same direction, F is the total frequency translation, ϕ1 is the angle of incidence of illumination, ϕ2 is that of the sighting direction, ϕ'1 is that of the focus direction, ΔP is the transverse deformation value at each of the central portions;

for an illumination direction of at least one channel, along which illuminating means receive signals, a deformation correction is made in at least one of the central portions by variation of the phase-shift of ΔP(2Π/C)(f cos(ϕ2)−(f+F)cos(ϕ1)+Fe cos(ϕ'1)), where f is the earth side frequency, Fe is the measured external translation value of the same sign as F if the frequency changes are in the same direction, F is the total frequency translation, ϕ1 is the angle of incidence of illumination, ϕ2 is that of the sighting direction, ϕ'1 is that of the focus direction and ΔP is the transverse deformation value at each of the central portions;

for an illumination direction of at least one channel, along which illuminating means receive signals, a deformation correction is made in at least one of the central portions by variation of the phase-shift of ΔP(2Π/C)(f cos(ϕ2)+Fe cos(ϕ'2)−(f+F)cos(ϕ1)) where f is the earth side frequency, Fe is the measured external translation value of the same sign as F if the frequency changes are in the same direction, F is the total frequency translation, ϕ1 is the angle of incidence of illumination, ϕ2 is that of the sighting direction, ϕ'2 is that of the ground focus or opposite focus direction and ΔP is the transverse deformation value at each of the central portions.

DESCRIPTION OF THE FIGURES

Other characteristics and advantages of the invention will further emerge from the following description. This description is purely illustrative and non restrictive. It should be read by comparing the attached drawings in which.

DETAILED DESCRIPTION OF ONE OR SEVERAL EMBODIMENTS OF THE INVENTION

1. General Description 1.1 Introduction

Figure 1:
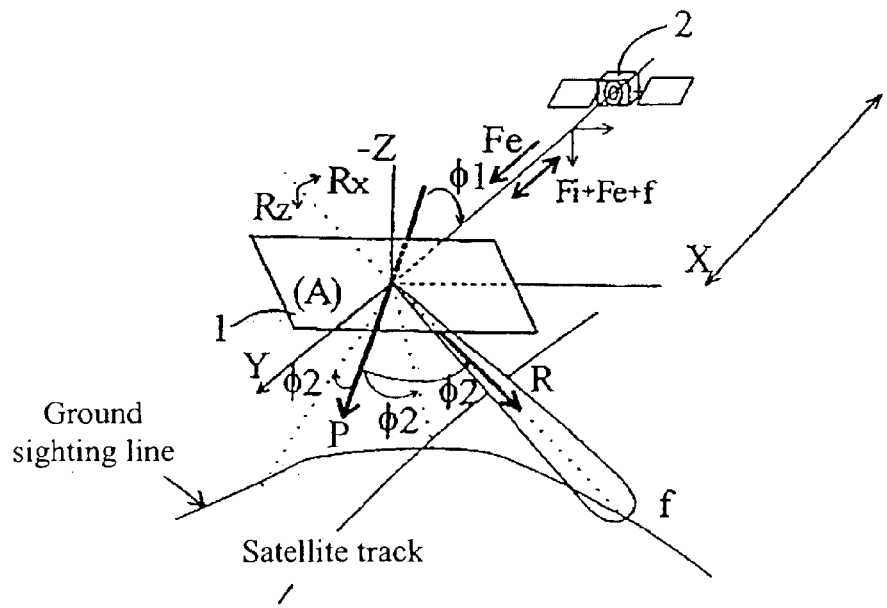
FIG. 1 is a schematic representation of a system complying with a possible embodiment of the invention.

A system is shown in FIG. 1 comprising a first satellite, with the reference 1 and subsequently termed prism satellite, and a second satellite, with the reference 2 and subsequently termed illuminating satellite.

The prism satellite 1 bears an RF antenna, while all the central payload functions are transported in satellite 2, the whole onboard-ground interface able to be provided via satellite 2.

This is in the same orbit as satellite 1 and is typically offset from it by 100 km. In both reception and transmission, the antenna of satellite 1 diverts the illumination signal, amplifies it and focuses it in the directions ordered by the mission.

Said antenna 1 consists of an active antenna which in transmitting or receiving operation receives RF signals on one of its faces and radiates them (to the earth or to satellite 2) via its other face.

Thus, this antenna does not include any cable through which the RF signals would be transmitted from (or to) a platform.

Immunity to deformation is achieved when the mean axis of mission sighting and that of illumination have an incidence on the prism (angle with respect to the normal to the antenna) whose cosine ratio checks special conditions detailed below according to the frequencies used in the mission and illumination, a special case being the identity of the incidences.

This allows the macroscopic deformation tolerances of the antenna to be increased by 10 (e.g. 10 cm in L-band instead of 1 cm), or the tolerances of knowledge of this deformation to be increased by 10 when an electronic correction is applied.

It will be appreciated that such a structure favors the deployment of very large antennas (>20 or 50 m) by simplifying or eliminating the mechanisms (no need of strong torques for opening out the cables and precise stop control) and stiffeners.

The multiplication of illumination directions based on several illuminating sub-assemblies of the same satellite or of different satellites enables, in a manner transparent to the antenna, the configuration of beams that it generates toward the ground to be multiplied.

The principle can be extended to the case of an illuminator located in a completely different orbit from that of the prism; one may consider, for example, a geostationary illuminator of a prism in low orbit. The illumination and sighting incidences are then no longer stable, but the self-compensation condition detailed below may be maintained by acting on parameters such as diversion, frequency of illumination or even possibly the physical attitude of the prism. In the rest of this study only the case of two satellites substantially in the same orbit is considered.

In a variant where the same face would provide the link to the illuminators and to the ground, the advantage of self-compensation of deformations would disappear but the advantage remains of the disappearance of the cables and transparent multiplication of beams in the presence of several illuminating sub-assemblies. Subsequently, only the configuration with signals passing between the faces is described.

The description that follows still considers a useful working zone of the antenna located on the earth; it may also be conceived that the antenna is aimed at a zone located in space (for example for the purposes of space astronomy, or linking with other satellites). It can also be conceived that the illuminating and prism satellites are in orbit around a heavenly body other than the earth.

1.2 Generic Geometry

FIG. 1 gives the generic geometry, the actual appearance differs according to the type of mission, radar or telecom, low or geostationary orbit. It should be noted that throughout the present text, the term radar includes all radiofrequency passive or active observation or detection.

The illuminator I is nominally located on the −Y axis, the speed vector is on Y irrespective of direction, the vector P is normal to the plane of the antenna. The antenna beam is aimed at the ground in a range set by the mission (vector R). The wave is propagated between the illuminator and the point on the ground, in one direction and/or in the other via the antenna.

The prism performs a simple or combined diversion according to whether the R, P and AY vectors are coplanar or not. For a simple diversion, $\phi2+\phi1$ is generally close to 90°.

Also shown is an orthonormal reference frame AXYZ where A is a point at the center of the antenna, AY is the speed direction of satellites 1 and 2, AZ being directed toward the center of the earth.

Vector P is defined by an angle a between AY and its projection in the plane AXY, and by an angle θ which is the angle that it makes with this projection.

The antenna target direction R is defined by the angles α' and θ'.

In FIG. 1, we also have axes Px, Py and Pz which correspond to the axes AX, AY and AZ after rotation of an angle a around AZ, then rotation of an angle θ around the direction Px thus obtained.

We also have axes Rx, Ry and Rz corresponding to the axes AX, AY and AZ after rotation of an angle a around AZ, then rotation of an angle θ around the direction Rx.

1.3 Translation of Internal and/or External Frequency

When the prism performs an amplification, i.e. in the general case of applying the concept, the interference coupling between the two faces must not bring down at the back reception input the forward transmitted signal with a level greater than 20 dB below the back signal. Such a decoupling is not easy to ensure in any case. The only means of becoming completely free of it is to create a frequency translation in the prism to be used in one and/or other of the transmission and reception links. Furthermore, this translation may be required for regulatory reasons, the back link being an intersatellite link coming under special frequency allocations. The latter point must nevertheless be able to be overcome since here the transmission levels and link paths are much smaller than for a standard intersatellite link.

The illumination frequency is F+f, f is the frequency used by the earth side mission, F is positive or negative. In the generic case the translation of frequency F carried out in the prism is the combination of two translations one of which, called internal, uses a tone generated in the antenna of frequency Fi and the other, called external, uses a translation tone of frequency Fe originating (or whose reference used to construct it by multiplication originates) from the illuminator, and such that F=Fi+Fe. If there are several illuminators, a single one called the focus transmits Fe. F and Fe are of the same sign if the Fe translation and the F translation are of the same direction. If there are several illuminators, a single one called the focus transmits Fe.

1.4 Geometry of Self-compensation of Deformations

An array antenna uses delaying and/or phase-shifting functions although ideally it should use only delays. Phase-shifting constitutes a false delay since it varies according to the frequency components of the mission signal and modulo (λ). Whatever the terms used in the description that follows, there is a certain latitude according to the type of application in interchanging phase-shifts and delays, even if the main diversion performed by the prism gains from the fact of its scope in the use of pure delay.

The operation of transmission to earth is considered. The case of receiving is the same when Fe is zero since all the devices are then reciprocal. The special features introduced by non-zero Fe are seen farther on.

The antenna is modeled by a deformation field (of non-planar type) $\Delta p$ according to P around a mean plane that it initially assumed normal to P, the attitude errors of the mean plane will then be analyzed. Self-compensation is attained when for any point of the prism, its projection in the plane normal to R sees the wave with an unchanged phase, or else the projection of $\Delta p$ on R has an identical and opposite effect in phase on both sides of the prism. For a single illuminator or one merged with the focus, the phase effect is $2\pi \Delta P \cos(\phi1)(F+f)/C - 2\pi \Delta P \cos(\phi1))Fe/C$ in illumination and $-2\pi \Delta P \cos(\phi2)f/C$ in transmission with $\phi2$ and $\phi1$ wave incidences on the prism side and illumination side. Self-compensation is obtained for: $\cos(\phi2)/\cos(\phi1)=(Fi+f)/f$ External translation does not occur in self-compensation geometry (we will see farther on that Fe, on the other hand, does act on the evolution of this geometry for illuminators at a distance from the focus. Sightings toward the earth performing self-compensation are on a cone with an axis normal to the prism.

The phase seen by the projection in the wave plane of each antenna point does not vary with deformation but the position of the projection in this wave plane moves. There are two translations in the wave place which are cumulative, one associated with the illumination in $\Delta P \sin(\phi1)$ and the other associated with the mission link in $\Delta P \sin(\phi2)$. The validity of the prism principle may be affected beyond a certain gradient regarding amplitude and phase distribution in the wave plane. If this distribution is only produced by the prism, only the translation downstream (on illumination for the receiving path, on the prism transmission for the transmitting path) of illumination (as seen in the wave plane) counts. We will see farther on a device option enabling these effects to be corrected.

1.5 Self-compensation Residue and Scanning Amplitude

For a modification $(\delta\phi1,\delta\phi2)$ of the geometry, the self-compensation residue is in $\Delta P(-\sin(\phi1)(Fi+f)\delta\phi+\sin(\phi2)\delta\phi2 f)$. It is mainly the second component that counts since it is that that results from the scanning necessary for the mission. The iso-incidence mission scanning component has no effect on the residue.

A residue threshold of 0.1 $\Delta P$ is set, i.e. a reduction in sensitivity to deformation by a factor of 10. For Fi=0, and a simple diversion we have $\phi1=\phi2=45°$ and $\delta\phi2=+/-10°$. If Fi is positive, the mission scan can be increased. For example, with a ratio of 5, we have, still in the case of a direct diversion, $\phi1=79°$, $\phi2=11°$ and there is no longer any actual limitation on the incidence scanning range (>+/−25°). On the other hand, the impact of the attitude error of the prism on the position of the self-compensation line of sight is increased if Fi is positive. This means in the worst case of a simple diversion, an attitude error modifying the incidence of sighting by $\delta\phi$ and that of illumination by $-\delta\phi$ causes a residue in $(\sin(\phi1)(Fi+f)+\sin(\phi2)f)\delta\phi$ which to be compensated requires a change in sighting incidence $\delta\phi2=-(1+\tan(\phi1)/\tan(\phi2))\delta\phi$, that is, an absolute change in the self-compensation sighting of $\tan(\phi1)/\tan(\phi2)\delta\phi$. For (Fi+f)/f=5, the sensitivity is 26 instead of 1 in the absence of internal translation.

The flatness constraint typically changes from λ/20 to λ/2. For example, in L band, the tolerance of 10 cm corresponds to the maximum bulge that would be made by an antenna dimension of 20 m obtained by 10 rigid panels connected with basic mechanisms ensuring only 0.5° of alignment accuracy. Taking account, moreover, of the low deployment torques in the absence of RF cables shape-memory mechanisms could be used. In P band (tolerance 35 cm), flatness is no longer ever a problem. But as we will see, the concept enables us to go even farther by eliminating any flatness requirement!

1.6 Electronic Correction of Deformation

If the deformation can be known or measured, we can then cut out the residue of compensation through phase-shifting: $\Delta P(\cos(\phi 1)(Fi+f)-\cos(\phi 2)f)$. In this case the relaxation provided by the prism only relates to the accuracy of knowing the deformation $\Delta P$, the flatness requirement being eliminated. This relaxation provided by the factor $(\cos(\phi 1)(Fi+f)-\cos(\phi 2)f)$ is associated with the differences of geometry (scanning range) as previously for the relaxation on flatness in the absence of electronic correction. Since a knowledge can be envisaged at better than $\lambda/2$, especially in L band, electronic correction enables both flatness to be freed and the scanning range to be increased. We will see farther on that illuminating signals offer a direct means of measuring deformations with the modest accuracy required.

Electronic correction may also be applied to the effect of translation in the wave plane of the illumination distribution, based on knowledge of the two translation components of the illumination distribution: $\Delta P \sin(\phi 1)$ and $\Delta P \sin(\phi 2)$. In this correction we do not have any relaxation with respect to the case of an electronic correction in a normal antenna, but the error sensitivity is less great (for most of the illumination distributions).

1.7 Examples of Geometry with Fi=0

Geostationary telecom satellite. Aim is generally taken around the nadir. The vector P is contained in the orbital plane and inclined at 45° with respect to the vertical. Diversion is simple. The relaxation factor on the deformation is 10 (scanning <+/−10°). Both illumination and mission radiation use the antenna in a ratio of 0.7 along the Y axis, there is no loss of efficiency in the other direction.

Radar or telecom side-aiming satellite in low orbit. This is obtained from the previous case by a roll rotation for example of 45° (35° to 55° scan) since the operation of the prism does not depend on the roll angle.

Radar or telecom SAIL satellite: The plane of the prism is vertical (contains the axis AZ). For a main side aim at 45° incidence the vector P deviates from the orbital plane by 35°. Diversion is combined. A SAIL satellite structure has been described in particular in the applicant's patent application FR 96 03434.

Swath mission in low orbit (radar or telecom). With P in the orbital plane, the self-compensation sighting cone meets the earth along a line globally transverse to the track and allows a non-geostationary swath mode. The relaxation of deformation is total if the beam can follow this line.

1.8 Discretization of the Coupling Between Faces

The implementation constraints (see § 3) lead to discretizing the coupling between faces along a mesh of tiles. The local deformations at the tile level are not self-compensated. Flatness can easily be imposed on reduced dimensions, on the other hand due to the fact of overall deformation the plane of the tile may diverge from the mean plane of the antenna, especially if the tile constitutes the antenna panel to be deployed. This point may lead to having several tiles per panel, even in the absence of deformation internal to the panel, all depending on the profile of the deformations. It is shown that, if the scale of the deformation is basically the dimension of the antenna (bowl profile, general case of thermoelastic effects) in a $\lambda/2$ envelope, a single tile per panel is sufficient so long as there are at least 10 tiles on each dimension.

If we have knowledge of the deformation we then know the tile alignment errors, we can correct them in the array antenna phase-shifters and allow faster deformation profiles without densifying the mesh. However, we do not have any relaxation on the accuracy of knowledge for these local corrections.

On the other hand, if the knowledge is based (with or without measurement) on an information model, local accuracy is generally better.

2. Operation in the Presence of Dispersions
(Attitude, Offset or Multiple Illuminators,
Frequency Errors, Etc.)

2.1 Modeling of the Prism Satellite 1 for Small Geometrical Differences

The purpose of what follows is to analyze the operation of the prism satellite 1 where there are small angular differences in attitude of the prism satellite 1 or in the position of the illuminators and the effects of sighting difference with respect to a reference sighting R.

Let us call the back and front equivalent face of the prism satellite 1 respectively the projection of the satellite prism 1 on the orthogonal planes at AY and at R. These two transformations from the actual face generally do not preserve either the lengths, or the angles. In the case of a simple diversion, a generatrix of the prism satellite 1 orthogonal to the plane (AY,P,R) remains orthogonal without any change in length, another generatrix orthogonal to the first remains orthogonal but there is a ratio $\cos(\phi 1)/\cos(\phi 2)$ between the front projection and the back projection.

The basic function of the prism satellite 1 may be broken down thus, whatever the order of the operations:

Translation Fi with the same phase at all the points of one or the other of the equivalent faces, which amounts to applying it over the actual surface according to a delay distribution on an inclined plane.

Translation Fe on the equivalent or actual back face with the phase along which the translation signal is received on this equivalent or actual back face, Link between the matching points of the back and front equivalent faces via a constant fixed delay for the prism.

When the illuminator is properly on the Y axis, the incidence of the wave is zero and the wave delay is constant over the whole surface of each of the equivalent faces.

2.2 Illuminator Deviation

In the absence of frequency translation, an illuminator deviation corresponds to an incidence $\delta i$ on the back equivalent face and entails a phase gradient with a slope in $\delta i$ f (for small $\delta i$ values). This gradient is reproduced on the front equivalent face, its orientation and its length are transformed according to the projection ratio between equivalent faces. The slope of the gradient and therefore the incidence created on the front equivalent face are reproduced in the ratio of the lengths. In the general case the geometry of illuminator and beam deviations respectively projected on the front and back equivalent faces is not preserved, there is an anisotropy. In the special case of a direct diversion, if the illuminator deviation is in the plane (AY,P,R), the phase gradient is aligned in this plane for all the faces, the deviations remain in this plane and are incidence deviations. Likewise, orthogonal deviations remain so and are iso-incidence deviations. The anisotropy relates to a modification of the incidence deviations only, by $\cos(\phi 1)/\cos(\phi 2)$.

Where there is an internal frequency translation Fi only, the phase gradient on the back equivalent face is in δi (Fi+f) and remains unchanged after transition to the frequency f. The gradient on the front equivalent face is therefore increased by the ratio (Fi+f/f). The internal translation modifies the deviation transfer function by the ratio (Fi+f/f).

The external translation has no effect on the illuminator which transmits this translation frequency (focus), everything takes place as if this illuminator were transmitting directly at Fi+f. In the case of a focus itself deviating, the prism satellite 1 is considered according to a new model with a new axis AY passing through the focus and a new axis R corresponding to the beam that would generate a virtual illuminator accompanying the focus and thus deduced from the old R by the deviation generated by the old prism subject to the deviation of this virtual illuminator and operating at Fe=0. In this new prism with its new equivalent faces, for an illuminator with a deviation of the focus, the external translation works like an internal translation and the deviation transform function is in (Fi+Fe+f)/f.

It may be concluded, in any case, that the prism satellite 1 operates like a lens whose illuminator would be located in an RxRz reference frame (see FIG. 1), originating from the true deviation reference frame XIZ by the same transformation as that between back and front equivalent face, followed by an amplification/reduction of the lengths in (Fi+f)/f with regard to the deviation of the focus around AY and (F+f)/f with regard to the deviation between an illuminator and the focus.

For a simple diversion geometry and in self-compensation with Fi=0 (see example telecom satellite in § 1.7) we have cos(φ1)/cos(φ2)=1 and we then have an isotropic transformation with amplification/reduction in (Fe+f)/f. In the case of a telecom prism, a deviation along X is reproduced on the ground with a beam footprint displaced along −X while a deviation along Z gives a displacement along Y. The self-compensation obtained with non-zero Fi, introduces anisotropy into a direct diversion, since the incidence transfer function becomes (cos(φ1)/cos(φ2)(Fi+Fe+f)/f=(Fi+Fe+f/Fi+f), while it is (Fi+Fe+f)/f on the other axis. This role of Fi on anisotropy is found for any type of prism in self-compensation since Fi determines the ratio of the front and back equivalent surfaces.

An illuminator deviation δφ1 displaces the self-compensation ground target line of sight by δφ2. If Fe=0, we have δφ2 such that the total remainder (−sin(φ1)(f+Fi)δφ1+ sin(φ2)fδφ2) is zero. If Fe is not zero, by assuming that the focus does not deviate as necessary in considering a new model of prism satellite 1 eliminating this deviation, another illuminator deviating by δφ1 with respect to this focus has a self-compensation sighting deviating by δφ2 with respect to the focus self-compensation sighting such that −sin(φ1) (f+Fi+Fe)δφ1+sin(φ2) fδφ2) is zero. Generally, the difference between the incidences of the self-compensation sightings corresponding to two illuminations and the difference in the incidences of these two illuminations are in the ratio sin(φ1)/sin(φ2)(f+F)/f.

2.3 Operation with a Bunch of Illuminator

Since the prism is a linear system, several illuminators deviating with respect to AY give several beams deviating with respect to R, in a completely transparent way for the prism.

An easily controllable multi-beam configuration is what results from illuminators offset on the orbit and therefore seen offset on AZ owing to the curvature of the orbit. It confers an alignment of beams along the orbit in the case of telecom satellite geometry, an alignment of beams transverse to the orbit in Sail geometry (see examples of geometry in §1.7).

Like a classical antenna, the prism satellite 1 can discriminate different channels (time or frequency) transmitted by an illuminator and assign to them a different beam. For a mission requiring a large number of beams, it is possible to combine the external multi-beam function originating from the multiplicity of illuminators with the internal multi-beam function conveyed by the prism satellite 1 to each illuminator in order to facilitate the setting up of a large mosaic of beams. §4 describes the telecom application in more detail by giving the illuminators the close pattern function within a large mosaic.

2.4 Advantage Contributed by Frequency Translation

The amplification/reduction of deviations (or incidences on front equivalent face) of each of the beams, brought about by the ratio (F+f/f. It is the whole bunch of beams formed by the bunch of illuminators that opens up or closes according to the ratio (F+f/f. Since the primary function of the prism is rather low frequency (which leads to large antennas) and taking into account the high frequencies of intersatellite links (>20 or 40 GHz), we see that we can obtain amplification ratios of over 20. As the implementation constraints (see §3.1) limit the spacing between earth side beams to a few degrees, with such amplification ratios the spacing between illuminators is then only some 10-3 radian. The illuminators can thus be covered by a single multi-illuminator satellite with arms of 5 m maximum for a distance to the prism satellite 1 of 5 km (for 10-3).

For cases of missions where the illuminators cannot be assembled on the same satellite, it may be useful to utilize reduction in spacing (if the low frequency f−|F|can be accommodated in an inter-satellite allocation) in order to relax the constraint on the relative navigation of the illuminators.

2.5 Response Regarding the Attitude of Prism Satellite 1

A change in attitude of the prism satellite 1 combines two effects with regard to the position of the beam footprint on the ground, the effect induced by the movement of the illuminator in a reference frame associated with the prism satellite 1 and the direct effect of the change in attitude of the reference frame. In accordance with the foregoing (§2.2), the movement induced by any illuminator if Fe=0 or by the focus otherwise is of an amplitude in the ratio (Fi+f/)f of the direct movement and it is found that, for high values of (Fi+f/)f, the sensitivity to attitude is increased overall. On the other hand, if Fi is negative or zero, it is the opposite or equivalent.

In any case, a roll attitude error only generates the direct effect, since the back illumination of the antenna is unchanged if the prism satellite 1 is in self-compensation geometry, an attitude error around an axis within the plane of the prism has no effect since it is similar to a deformation transverse to the prism. Any change as a function of Fi of the induced effect only takes place on the third attitude axis orthogonal to the first two, i.e. on the yaw axis in the case of the telecom prism, on the pitch axis for the SAIL prism.

Still in the case of a compensation geometry, let us break down the attitude error vector according to a component ρ along the roll axis AY and a component σ in the plane of the prism. The σ component has no effect on the phase of the points projected in a plane normal to R. On the other hand, the translation of the points in this plane corresponds to a rotation around R of a value equal to the projection of σ on R. Thus, the vector of deviation δR is the result of a roll effect ρ on R and of rotation of this effect around R of value (σ.R).

In the case of a telecom prism aimed at the nadir, for an error in pitch t, we have ρ=0 and therefore no effect. For an error in yaw 1, we have $|\rho|=l/\tan(\phi 1)$ and $|\sigma|=l/\sin(\phi 1)$. The roll $\rho$ rotation is combined with a rotation around R and thus in yaw of value $\cos(\pi/2-(\phi 1)l/\sin(\phi 1)=l$. The yaw rotation is the same as that of a normal antenna, a roll is added as $l/\tan(\phi 1)$. For Fi=0 the roll is of the same amplitude as the yaw. We find this same result by ascertaining that in pitch both direct and induced movements are compensated, in yaw the induced movement is transformed into roll and is superimposed on the direct yaw movement.

2.6 Operation in Reception with Non-zero Fe

All the foregoing applies to both transmission and reception provided that Fe is zero. Otherwise, the operation of the illuminator spacings is preserved but not the self-compensation. There are several options for modifying the device to keep equivalent in reception.

2.6.1 Receiving Translation with Ground Reception Focus Signal

Let us consider a ground reception focus along an incidence $\phi 2$, $\phi 1$ being the incidence along which an illuminator receives the signal.

Let us consider a ground sighting of incidence $\phi 2+\delta\phi 2$, the total residue of compensation is in $\cos(\phi 1)(F+f)-\cos(\phi 2)$ $f-\cos(\phi 2)Fe+\sin(\phi 2)\delta\phi 2$ f. Self-compensation is obtained when:

$\delta\phi 2=(\cos(\phi 2)(f+Fe)-\cos(\phi 1)(F+f))/(\sin(\phi 2)f)$, which defines a receiving self-compensation line on the ground.

The deformation residue is sensitive to the deviation of the sighting around this line (in $\sin(\phi 2)\delta\phi 2$ f) and to the attitude error $\delta\phi$ of the prism in $(\sin(\phi 1)(F+f)\delta\phi+\sin(\phi 2)$ $(Fe+f)\delta\phi)$ in the unfavorable case of a simple diversion. The first term is unchanged with respect to the case of transmission, on the other hand it seems an additional sensitivity to the attitude in $(\sin(\phi 1)Fe+\sin(\phi 2)Fe)\delta\phi$ which may be penalizing if Fe is positive and large compared with f or Fi+f.

In choosing Fi=0 and $\phi 1=\phi 2$, the transmission self-compensation line also achieves reception self-compensation, but the reception focus must be on this line. It is thus possible to adjust Fi and Fe to have transmission and reception self-compensation lines very close together even if the reception focus cannot be near this line.

This receiving ground focus solution is tricky to use in non-geostationary orbit unless Fe is small, as the correspondence of the self-compensation lines cannot be maintained.

2.6.2 Reception Focus in Orbit Opposite the Illuminator

A special position of the reception focus is on the orbit with an illuminator means located on the opposite side with respect to the prism. We then have $\phi 2=\phi 1+\gamma$, $\gamma$ negative and small owing to the curvature of the orbit. According to the foregoing, the self-compensation sighting is obtained for $\delta\phi 2=-Fi\cot(\phi 1)/f-\gamma(f+Fe/f)$ and an incidence $\phi 1+\gamma+\delta\phi 2=\phi 1-(Fi\cot(\phi 1)+\gamma Fe)/f$.

Since $\gamma$ is negative, it is thus possible to adjust Fi and Fe so that the self-compensation on reception takes place at the same incidence as on transmission, i.e. at $\phi 1$, for example taking Fi=0 on transmission and Fi, Fe on reception such that Fi $\cot(\phi 1)+\gamma Fe=0$.

The advantage of this solution compared with the previous one is that there is no additional effect of the attitude error on the residue if F and Fe are close (low Fi) as the effects on $\phi 1$ and $\phi 2$ are the same when they confronted with a ground focus. Finally, this solution is valid for any type of orbit. A drawback is that in the absence of an internal frequency the transmission self-compensation cannot be made to correspond with that of reception and the deviation can be large if Fe/f is large.

2.6.3 Use in Reception of the Transmission Focus Signal Negatively

If now we use the transmission focus translation frequency for receiving, with an opposite sign, i.e. the reverse of that necessary for passing from f to f+F, then completing it with the internal frequency, we then have the total residue in:

$\cos(\phi 1)(Fi+Fe+f)+\cos(\phi 1)Fe-\cos(2\phi)f=\cos(\phi 1)(Fi+2Fe+f)-\cos(\phi 2)f$, with Fe and Fi of opposite signs.

With Fi=Fi'−2Fe=F−Fe we have the same self-compensation condition as for transmission with an internal translation Fi'.

Only the Fi' component of Fi is applied on the actual face with a phase (or delay) gradient as for a normal internal translation. The component Fi"=−2Fe is applied on the actual face without a delay gradient. It may be considered that the translation takes place on the back equivalent face that may still be defined normal to direction of the focus. This translation mixes a signal Fe that has previously traversed this face orthogonally to reflect on the actual face and return with a phase gradient due to this double path, and a signal Fi" whose phase gradient is due to the single path from the actual face. If $|Fi"|=2|Fe|$ both gradients are of the same amplitude, and are compensated since the translation of Fe is negative. Possibly there only remains the phase gradient originating from an incidence of mission signal f on the front face reproduced on the back after anisotropy and amplification/reduction in $f/(Fi'−Fe+f)=f/(F+f)$ as for a normal prism.

It is verified that the sensitivities of the self-compensation sighting to the deviations of the transmission focus illuminator of Fe, to the illuminator deviations with respect to the focus, and to the attitude of the prism are the same as those expressed in §1.5 and 2.2 in the case of transmission with internal Fi' and external translation −Fe (i.e. positive Fe). Likewise, irrespective of the geometric condition of self-compensation, the effect on the reception beams of the deviations of illuminators and between illuminators or of the attitude of the prism are unchanged.

This is the ideal solution once it is allowed to have an internal frequency.

2.6.4 Reception Translation with the Transmission Focus Signal Alone

With Fi=0 it must then be that Fe<f and the self-compensation condition is $\cos(\phi 1)(f+Fe))+\cos(\phi 1)Fe-\cos(\phi 2)f=\cos(\phi 1)(f+2F)-\cos(\phi 2)f=0$. For F small compared to f, $\phi 2-\phi 1=2\cot(\phi 1)F/f$. If not too much deviation is wanted at the transmission and reception self-compensation points, F/f must again be small here.

2.7 Dispersions of the Frequencies Fi, Fe, f 2.7.1 Variation of Deviation in the $\Delta F$ Band The amplification/reduction of the angular deviation is in $(F+f)/f$ and therefore varies in the $\Delta f$ band. The relative error on the deviation between beams is in $-\Delta F/f(F/(F+f))$. As the angular amplitude of the mission pattern created from several illuminators is limited to a few degrees, this does not pose any problems with relative bands of a few % (and positive F).

If two paths are considered, we can have a total relative large band and it may become necessary to have one translation frequency per path.

2.7.2 Relative Instabilities on Fi and Fe

With a single illuminator and Fi=0, everything takes place as if there were only a single frequency source.

The amplification/reduction of the angular deviation is in $f1/(f1-F)$ or f1 is the transmission frequency of the illuminator and F that of the frequency translation. If Fi is not zero and/or in the presence of several illuminators, F and f1 are of separate frequencies. The relative error on the angular deviation $\mu$ that results from relative frequency instabilities is written $\delta\mu/\mu < St-((f1+F)/(f1-F))St$, with $St$=relative frequency stability (also includes the relative Doppler). The effect is maximal for F>>f amounting to =2 (F/f)St. The relative error on the deviation between any two beams is smaller as the source of error brought about by instability of the translation is common. With a relative stability of $10^{-5}$, i.e. no special precaution, the absolute angular error remains insignificant in view of the low values of deviation envisaged.

The frequency Fi must be applied at constant phase on the reception equivalent face (front or back), i.e. on the actual face by means of a delay gradient in sin ($\phi1$) or a phase gradient in sin ($\phi1$) Fi. A phase gradient can be easier to achieve, but nominally set up for the theoretical value Fi, it introduces a phase gradient error in sin ($\phi1$) $\delta$Fi in case of $\delta$Fi on Fi. This error is compensated by an incidence deviation $\delta\phi$ on the front equivalent face such that $\delta\phi \cos(\phi2)f=\sin(\phi1)\delta Fi$. For a direct diversion we $\delta\phi=(Fi/f)St$. For ha Fi/f=20 (large amplification of deviation) we have $\delta\phi < 20 \cdot 10^{-5} < 10^{-2}$ degrees.

The case of reception translation with transmission focus (see §2.6.3) is different since Fi" is applied without delay gradient. On the other hand, this case is sensitive to the difference between |Fi"| and 2 |Fe| which generates a residual phase gradient on the back equivalent face compensated by an incidence $\delta\phi$ of the reception beam on the front equivalent face such that $\cos(\phi2)f\delta\phi=\cos(\phi1)((|Fi"|-2|Fe|)$. In a self-compensation geometry $\cos(\phi1)/\cos(\phi2))=(f/(Fi'+f))$ and $\delta\phi < 3 \, St(|Fe|/f)(f/(Fi'+f))$. For positive Fi' and a large amplification of deviation (|Fe/f|>20) we $\delta\phi < 3 \cdot 10^{-2}$ degrees.

The relative stability can become a constraint if the opening of the mission beam is less than 0.3°, that is, an effective antenna dimension of 38 m in L band. This constraint can be got round by using delay lines for applying Fi and by slaving |Fi"| onto 2 |Fe| at one of the Fe reception points on the prism (or on the platform.

2.8 Electronic Correction of Geometry (Illuminators and Attitude) Based on Illumination Signals The illuminator satellite 2 (whose center has the reference I in FIG. 1) and the prism satellite 1 (whose center has the reference A in FIG. 1) can be analyzed like two satellites evolving in a tube of certain diameter. The axis IA is liable to diverge from the Y axis in the reference frame of the antenna satellite. Just the distance between the two satellites and the curvature generated form a deviation factor. Subsequently we consider the two satellites 100 km apart from each other and a tube of 5 km.

Both satellites know their position, that of satellite 2 can be transmitted to satellite 1 via the service channel which anyway must exist for passing antenna control orders. A can thus know the orientation deviation and eliminate the effect induced by phase-shifting at the coupling points between faces. The attitude error of the antenna slightly mars this correction of induced effect since this does not take place in the actual plane of the antenna (order 3 product of attitude errors and illumination deviation), but above all the direct effect of the attitude error is not corrected.

As an option, we can also measure the attitude of the prism to correct it at the level of the array antenna's sets of phase shifters. For this it is sufficient to measure the differences of illumination phases between two receiving points on the antenna and for two 2 pairs of points. Each pair is used to measure a component of the AI vector in the prism reference frame. Once the orientation of AI is known, we know that of the prism frame, apart from its position in rotation around AI, i.e. basically its roll position. The system then becomes fully corrected in attitude, except for the roll axis, where everything remains as for a classical satellite. Once we have knowledge of the attitude, whether or not based on the illumination signals, we can independently choose the type of effect (attitude or illuminator) and the axis of dispersion that we wish to compensate or not, in order to preserve some of the prism's natural transfer or self-compensation functions.

Measuring phase differences can be done with the mission signal (radar or telecom) or by phase measurement on an external translation tone or a tone introduced for this purpose. Since we are aiming at large antennas (>20 m), a modest precision (1 cm) already confers an attitude precision of 3 hundredths of a degree. The drawback we already find if Fi is non zero, is the necessity to route a signal from one point to the other of the antenna.

In the case of several separate illuminators we can compensate on a particular illuminator or on a virtual illumination direction referenced with respect to the real illuminations, while the attitude measurement uses the signal from one or from several illuminators. The impact on beam geometry of variations in inter-illuminator geometry is not, of course, corrected.

2.9 Electronic Correction of Deformation Based on Illumination Signals

The correction of the deformation $\Delta P$ (by subtraction of the self-compensation residue $\Delta P(\cos(\phi1)(Fi+f)-\cos(\phi2)f))$ is done at each coupling point or at the phase shifters of the array antenna tile associated with the same coupling point. In the second case we can interpolate between the coupling points. Whatever the means of measurement, it may be useful to couple this measurement with that of the attitude of the mean plane obtained from the illumination signals.

The illumination signals can also be used for this measurement by generalizing the phase measurement envisaged for the attitude for all coupling points.

2.10 Fi or Fe?

Fi can be simpler to set up than Fe. With a single illuminator, the usefulness of a large (Fi+f)/f ratio for a self-compensated prism lies in increasing the incidence of illumination and thus increasing the effective surface of the antenna for the mission, reducing the sensitivity to the scanning range, reducing the effects of translation in the wave plane if the illumination distribution is effected via the prism and not via the illuminator. On the other hand, the sensitivity to attitude of the prism is increased, both for the direction of the beams and that of the self-compensation sightings. Fi is a good solution if the only need is to create a translation of minimum value.

With an illuminator bunch, Fi cannot bring about strong amplification or reduction of deviation on both dimensions at the same time (since Fi increases anisotropy). When seeking to integrate the illuminator into the same satellite, Fe must be used in the main.

2.11 Combinations with Several Prisms

2.11.1 Illuminators Common to Both Prisms

If the prism satellites 1 are located on the same side relative to the illuminator satellites 2 along the orbit, they should be offset on the same orbit, or on orbits having differences in ellipticity and/or in orbital plane in order to ensure both non-collision and the absence of masking of the illuminators view. The solution of offsetting on the same orbit has the drawback of expanding or compressing the relative geometry of view of the illuminators owing to differences of distances, which can be detrimental to instances where several prisms combine together on the same mission with the same ground beams, in particular in the case where one prism ensures transmission to the ground and the other reception.

It is possible to double the prism or combination of prisms by placing them on each side on the orbit of the same illuminators. For opposing prisms having to sight on identical beam footprints on the ground, it is necessary to invert the deviation transform function on one of the prisms, since otherwise the deviations on the ground are inverted owing to the mirror geometry. This is obtained by changing from F+f to f not by a "back signal (F+f)—reference F" mixture but by a "reference (2f+F)—back signal (F+f)" mixture. The self-compensation functions of the deformations are preserved, the deviation is multiplied by the ratio —(F+f)/f.

2.11.2 Each Prism Bears the Illuminator of the Other Prism

Some telecommunications missions in addition to the dual mission path use a dual connection path to one or more ground points where mission beam mixing can be carried out if this is not done on board (in the illuminator or illuminators in the case of the prism) and where accesses with the terrestrial network can be concentrated. In this case the illuminators support the ground connection dual path link. When the mission uses several prisms, another approach consists in having the illuminators of one prism borne by another prism and vice versa. The multiple illuminators can be arranged on the perimeter of the prism antenna or more easily on the back, not very full as we shall see farther on, when it involves opposed prisms in relation to the illuminators.

2.12 Case of a Prism Operating in Reflection

All the foregoing could be applied in the same way to a prism operating in reflection. Multi-illuminator operation remains the same but without inversion of the deviations, on the other hand the deformations and attitude errors are not compensated but doubled.

3. Analysis of an Implementation Architecture 3.1 Architecture of the Antenna and of the Coupling Between Faces:

The prism antenna is a signal diverter. Around a set basic diversion is added the beam scanning necessary to the mission. The basic diversion must, in principle, be obtained by a pure delay (except in the case of a relatively small band where a phase shift is sufficient for the whole diversion) introduced at each point between the back face and the front face. The purpose of the delay function, by being added to the geometrical delay between two matching points of the equivalent front and back faces, is to make the total delay constant for all pairs of points. The delay function is the opposite of the geometrical delay, it is two-dimensional for a combined diversion. Since the delay values are of the order of the antenna dimensions, it is necessary to sample this function extensively to reduce the number of delay in order to be able to introduce them into the antenna section. The antenna must therefore be meshed in tiles containing a single coupling point. Deformations are then no longer compensated inside tiles but this is not detrimental to the usefulness of the concept since flatness is especially difficult to keep over large dimensions (see §1.8).

Figure 2:
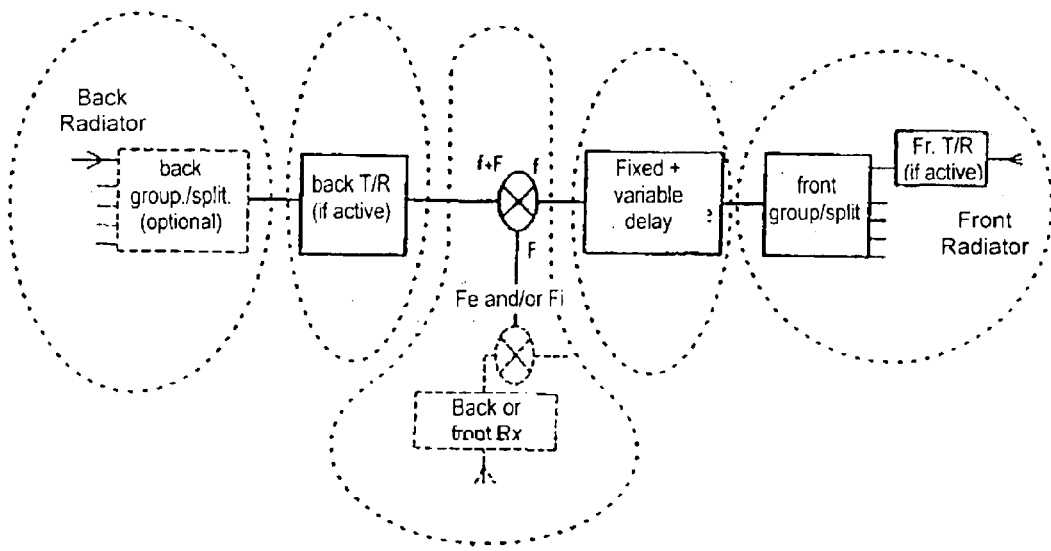
FIG. 2 is a synoptic representation of the different function performed by the different antenna tiles.

Inside a tile, going from the rear face to the front face, the means constituting the antenna perform the following different functions, illustrated in FIG. 2: Grouping/back splitting (stage 1 in FIG. 2), back amplification (stage 2), frequency translation (stage 3), fixed and/or variable delay (stage 4), grouping/front splitting (stage 5). These stages are covered by the signal in both directions.

The part in front of the delay is unchanged compared to a current array antenna (which also needs fixed and adjustable delays but which can be left in the platform).

Grouping/splitting is not carried out according to equal lengths since must reproduce the front or back component of the delay function seen in the tile. As for any antenna it is generally organized in two splitting/grouping stages, one for each antenna dimension. Here each stage can be a delay gradient to be followed. Beyond a certain slope, in order to limit the length of the connections, it is preferable to adopt a distribution in successive branches along a trunk aligned on the dimension assured by the stage rather than a star formation splitting/grouping at differentiated lengths from a central point. For an active antenna (with integrated amplification), the back splitting/grouping is not necessary if the signal is only sampled at a single back point of the tile. As will be seen, in spite of everything, a minimum surface area must be kept, but this is sufficiently small for treating the splitting function as forming an integral part of the back radiating element. It is then possible to keep the back face available for possible heat protection devices or stiffeners as is generally done, or for solar cells in the very special case of SAIL geometry (/1/).

The back amplification/reception brings into play very low power level (see below) and can therefore be conceived as a modification of primary amplification/reception that is found in standard array active antennas for relaying signals from or to the platform.

It is concluded that:

Except for frequency translation, the only significant difference compared to a classical architecture is the introduction of a fixed delay inside the tile. The controllable delay, the need for which and whose dimensioning (depends on the bandwidth and mission misalignment around the basic diversion) are unchanged, must also be here in the tile.

In the case where the tile is the panel to be deployed, the fixed delay does not introduce any additional constraint, on the contrary it comes in place of the RF transmit/receive cable connecting the panel to the platform, which makes more total length and which complicates deployment.

The principle must be applied with discretion in order to derive the maximum benefit. For example, in the case of an elongated antenna, one would only seek to compensate for deformations on the length, the more so since the latter generally corresponds to the axis of deployment most affected by the inaccuracies of the mechanisms.

3.2 Impact of Sampling the Coupling Between Faces (Size of the Tiles)

The fact of having sampled the coupling between face can produce on the front face phase distributions with breaks and translations between tiles, at the origin of sub-array lobes, which among other disruptions lead to a loss of antenna gain.

When there is neither geometrical deviation of illuminator or attitude, nor deformations, there are no breaks, since the delay function has been set up inside the tiles and between tiles for this configuration. At worst, as for a normal antenna, when there are major mission misalignments breaks appear due to the fact that the controllable delay function is also sampled.

The geometrical deviation induces on the back face phase distributions which are found on the front face in a sampled form and produce deviations (in the antenna frame of reference) of beams with sub-array lobes. If we wish to limit, for a maximum deviation of beam of 1°, the sub-array lobes to −18 dB and the losses of gain to 0.2 dB, an effective sampling (as seen along the sighting direction) of less than 7 $\lambda_f$ (that is, 7 $\lambda_f$ per actual 10 $\lambda_f$ for the telecom prism) is necessary. The whole of the induced effect can be eliminated by applying the geometrical electronic correction described in §2.8, which uses a phase shifter by coupling points, or the same phase-shifting on all the phase-shifters of the tile. There is then no longer any limit on the illuminator or attitude deviation. If the attitude is known, the attitude and. illuminator deviations can be corrected independently. The direct effect of the attitude is eliminated by a phase gradient which, on the other hand, requires all the tile and antenna phase-shifters in order not to recreate lobes.

When the attitude or illuminator geometrical deviations are absent or corrected of their induced effects, the sampling of the coupling only depends on the deformation profile around the mean plane, the movement of the mean plane being a geometrical deviation. It has been seen (§1.8) that the electronic deformation correction combined with a rectification of the local slopes of the panels can relax the sampling.

In the presence of several illuminators, only the induced effect of the attitude and a single direction of illumination can be eliminated or monitored. The latter may be virtual, preferably chosen in the middle of the bunch of illuminators. The induced effects of illuminator deviations in relation to this corrected direction cross the prism and constrain the sampling. With an effective sampling of 7 $\lambda_f$, we may only have +/−1° of beam bunch opening.

3.3 Back Link Balance, Back Filling Rate of the Tile

The reception gain of the system consisting of the prism and illuminator is formed in two stages: at the grouping level before the tile then subsequently in the back link at the level of the illuminating reception. If s is the maximum signal to noise ratio of the mission (S/N max.) and ρ is the number of tiles, S'/N' max. at the tile grouping output is at the is s/p. The back link carries the ρ signals S' and the ρ noise N' and adds a noise N". So that the total noise B' is not affected by more than 0.5 dB by this link, it must be verified for each tile that N'/N">8/p. Which is used to determine the power necessary in each tile for transmitting N', this is necessary when the signal present is at the maximum s/p times greater. If it is assumed that the illuminator antenna is 1 m^2 in area, that the total losses on reception (+noise factor) and transmission come to 8 dB (pessimistic), that the distance is 100 km, that the mission bandwidth is 300 MHz, that the tile is filled at the back over an effective surface area seen by the illuminator of 1.4 $\lambda_{F+f}$ by 1,4 $\lambda_{F+f}$ (that is, for a telecom prism, a single radiating element of actual area 2 $\lambda_{F+f}$ by 1,4 $\lambda_{F+f}$ made directive toward the illuminator by the coupling of several elementary radiators) then the power to be transmitted does not depend on $\lambda_{F+f}$ and is 0.16 s/p² W. With s=25 dB and a minimum of 10 tiles, 0.5 W is therefore needed per tile. On the other hand, since the amplifier has to operate in linear mode, a standard MMIC of 2 to 3 W may be provided.

The signal transmitted by the illuminator must be received by each of the back grouping points with a high S/N so as to keep a purity of signal and to ensure that the front transmission power of the antenna remains devoted to the signal and not to the noise. It is above all the second constraint that takes precedence since the p tiles together improve the purity in the ratio p. A S/N>20 dB will be taken. Which, adopting the same assumptions as previously requires a transmission power of 2 W.

The back diagram of the prism resulting from p elementary links is the same as that used by the mission to earth at almost the scalings resulting from the aspect angles of the antenna. In the presence of induced geometrical effects (illuminator attitude or deviation) every two bear the same sub-array lobes associated with the sampling of the coupling function. But the back sub-array lobes are higher in level (or even equal to the main lobe) when the tile is not very occupied at the back since they are not modulated by the gain of the tile. The non-filling of the back does not constitute an energy problem but can lead to the risk of parasite illumination via a sub-array lobe. The parasite illumination to be avoided for a prism in low orbit are those of terrestrial origin. The tile filling considered previously is sufficient since it close the bunch of lobes over a half-angle of 20° around the Y axis. With the effective mesh of 7 $\lambda_f$, the first lobes of the sub-arrays on the front face are +/−3° away from the main lobe while the opening of a bunch of "transparent" beams is limited to +/−1°. This same ratio of 3 is found at the back between the sub-array lobes and the illumination directions, so that even strong array lobes do not hinder operation with several illuminators.

It is concluded that a radiating element of 1.4 $\lambda_{F+f}$ by 1.4 $\lambda_{F+f}$ (effective) per tile is sufficient (no back grouping splitting). The back filling rate of f/(25(F+f)) is low, all the more so as generally (F+f)/f is large.

3.4 Frequency Translation

In each tile the transmission signal is mixed with a translation signal that can originate from an internal signal or an external signal transmitted by the illuminator (or from the ground) or from a combination of the two. By applying the same transmission level (2W) to the external translation signal as the mission signal, the back link balance ensures the purity of the translation signal at the mixer input by means of simple reception (and amplification) in a 10 MHz filter (S/N of 35 dB). While we can now choose a permitted frequency for the mission illumination, this is not the case for the external translation signal. However, tolerance in the matter will be further tenable in view of the fact that it involves a pure tone or spot frequency. The transmission of an external translation reference on another frequency chosen more freely is also possible, but the mixing is no longer direct and must be preceded by a consistent frequency changer. But in this case the external reference can then be placed in the neighborhood of the mission illumination band and not have to duplicate the back reception path.

The mixer with the mission signal can just as well be placed after the prism delay, but in this case the translation tone must also go through this delay, which does not induce a duplication of links since the tone and the signal located at different frequencies can pass through together. This solution is even better in the case of a multi-beam function prism since as the illumination takes place over as many frequency channels as beams, it is desirable to pass all this multiplex in a single coupling per tile rather than have as many couplings as channels. The solution even offers a second advantage in the sense that where the translation tone where tones F and the signal to be translated F+f undergo the same effect of delay line errors (expansion), and therefore after translation this is only seen at the frequency f, as in the case without translation. Phase-shifting and delay being equivalent concepts for a pure tone, a simple phase shift, moreover ensured by the existing phase shifters in the tile, enables avoiding having the tone routed in the delays. Two partially conflicting translations can also be applied so as to routinely place the delay at low frequency whatever F and f may be. In this way, a single low frequency delay line technology is used to create any type of prism. The drawback of this approach is described in §2.7.2 and concerns the effect of Fi frequency instability when phase shifts replace delays for the Fi tone.

4. Illustration in Geostationary Multibeam Telecoms: 400 Offset or Multiple L-band 400 km Beams 4.1 Implementation of the Mosaic In a multibeam mosaic of a standard telecom mission, generally several neighboring beams use several different sub-band of the mission band and the elementary pattern formed by these neighboring beams is repeated by re-utilization of frequency for forming the mosaic. For 4 sub-bands, the elementary pattern is a diamond.

The pattern to be made by the illuminators must be formed of a whole number of diamonds and is then repeated by the internal multibeam function (or rather multi-bunch here) of the antenna. The latter uses several beam forming networks (BFN in English), i.e. several front groupings/splits (see §3.1) each leading to a specific beam when a single illuminator is present. In the presence of a bunch of illuminators, each of these specific beams is multiplied to form a bunch of beams. In addition to the advantages already pointed out, the interest of the prism lies in reducing the number of BFN necessary for a given mosaic.

Figure 3:
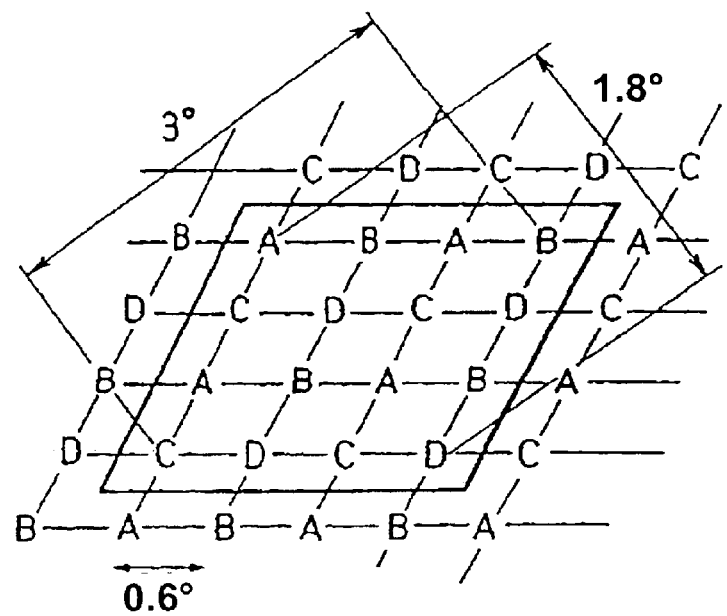
FIG. 3 is a schematic representation of a mosaic of beams that may be obtained with a system complying with a possible embodiment of the invention.

A telecom prism is used in geostationary orbit, inclined at 45° with respect to the direction of earth and operating in external translation. The L-band antenna has an effective dimension of 20 m (28 m actual east-west) we thus have a beam with an opening of 0.6°. A pattern of 16 beams, as illustrated in FIG. 3, requires an actual mesh of 6.6 $\lambda_f$ (E/W) and 7,7 $\lambda_f$ (N/S). For a mission covering the whole face of the earth, this pattern must be repeated approximately 25 times. 3 satellites provide worldwide coverage with 3 times 400 beams each 400 km in diameter.

4.2 Architecture of the Prism and the Illuminator

Each illuminator transmits 25 j signals on separate channels that the prism can sort and redirect at the input of one of its 25 BFN. If frequency multiplexing is chosen (among other types of channeling), the frequency translation function of the prism is achieved right away. There are offsets of sub-bands between the multiplexes corresponding to beams of the pattern having to use separate sub-bands. A single illuminator transmits the translation frequency comb or the reference that enables it to be reconstructed.

Inside a pattern, the variation in spacing between beams due to the fact that the different illuminators do not operate in the same sub-band is small and can in any case be compensated in construction at the level of inter-illuminator geometry. From one pattern to the other the internal spacings vary since the amplification ratios vary (in (Fj+f)/f), the pattern expands or shrinks. This can be taken into account in the multibeam function of the prism by adapting the width of the beam so as to maintain the juxtaposition, this adaptation is necessary anyway for other reasons (variation of incidence on the ground, of the effective size of the antenna in the sighting direction). Note also that the relative angular deviation is limited by $\Delta F/F$, here little different from $\Delta f/f$ since $\Delta F=25\ \Delta f$ and $F/f=20$. With a $\Delta f/f$ of a few % the error is only a few hundredths of a degree.

The differential deviation between transmission and reception can be large, as shown in §2.7 the adoption of a constant ratio $Fj_{transmission}/Fj_{reception}$ equal to the ratio $f_{transmission}/f_{reception}$ settles the problem at the price here of a slight increase in total spectral occupation for the illumination link which must be 25 $((1+\max(f_{transmission}/f_{reception}, f_{reception}/f_{transmission}))\ \Delta f$ instead of $2*25*\ \Delta f$.

Overall, this multibeam application benefits from the fact that illumination at very high frequency enables first the inter-illuminator spacing to be reduced until just making a satellite, and secondly, by means of a relative band similar to that of the mission, to have an absolute bandwidth allowing the stacking of a large number of beams. This is also consistent with the fact that the bands allocated to the inter-satellite links are high and wide, even if, as already pointed out, the specificity of the geometry and levels allow envisaging working in bands not allocated for this purpose.

For the illustration in question in band L at 1.5 GHz in transmission and 1.6 GHz in reception with 20 MHz of band, the spectral occupation in illumination with 25 channels is 500 MHz the transmission and 500 MHz in reception (or 530 MHz if we wish to verify a constant $Fj_{transmission}/Fj_{reception}$ but this does not seem necessary). By taking 32.25 GHz as the central frequency of reception illumination and 32.75 GHz for that of transmission, the amplification ratios are 21.5 in transmission and 20.5 in reception, which only generates a maximum error of 7.5 hundredths of a degree on the large dimension +/−1.5° of the pattern. The whole thus fits into the allocated band 32–33 GHz for intersatellite links.

The illuminating satellite 2 has 16 antennas on a lacunary structure reproducing the pattern with a span of 12 meters in one direction and 7 meters in the other at a distance of 5 km, 2.4 m by 1.4 m respectively if the distance can be reduced to 1 km. The second option is, of course, preferable from the satellite point of view, the first being so from the navigation point of view since the precision of relative distance must be of the order of 5% in order not to create a displacement of the end beam of the pattern of more than 7 hundredths of a degree (12% of the opening of the elementary opening). It may be noted that the structure of a satellite 5 km away has no requirement for dimensional control, a precision of 5% for inter-illuminator spacing being sufficient (that is, 10 cm). Finally, note that there are other still higher intersatellite bands that can be sued to further increase amplification and reduce the inter-illuminator spacing.

Such a mission offering 400 beams with a 400 km ground footprint and requiring an effective antenna size of 20 meters is hard to achieve today in the classical approach since it would be necessary to have 400 BFN in a large antenna for which dimension control would be required at $\lambda/20$.

4.3 Case with Separate Illuminating Satellites 2

Other applications of the prism satellite 1 can lead to separate illuminating satellites 2. The implementation of the pattern remains possible by having a visible wheel made on each illuminator seen from the prism. This is obtained via a combination of inclination deviation and eccentricity with respect to the orbit of the prism. For this approach it is preferable to seek a certain distance (100 km) to gain in relative navigation precision. The pattern rotates about itself in 24 hours, it is necessary to accompany this movement by making the whole of the mosaic turn at the level of the prism multibeam function, which may constitute a constraint if this function does not need to be variable elsewhere.

5. Prism and VLBI Interferometry Along the Track for Microwave Imagery 5.1 Introduction and Principle It is well known that the size of antenna constitutes the main difficulty in passive microwave radiometry, in particular when it involves surface imagery (hydrology, biomass, salinity) where it is a matter of reconciling low frequency and good resolution. The use of the prism concept is already justified for its large antenna capabilities, but the geometry of two satellites following one another also allows the use of the VLBI technique (very long baseline interferometry) for obtaining the resolution in the dimension along the track (along the ground projection of the orbit) and thus reduce the constraint of antenna size in the only dimension that enables transverse resolution to be obtained.

According to the VLBI principle, the complex intercorrelation (with integration and detection in I and Q) of the signal received by the prism with that received directly by the illuminator makes an angular discrimination around the ground source of the signals as a function of the angle 90-$\beta_0$ that the incoming signal direction makes with the illuminating prism axis.

The modulus of the intercorrelation (Root ($I^2+Q^2$)) is of the form:

|SINC ($\pi$ B D (sin($\rho$)−sin($\beta_0$))/C)| with

B=bandwidth,

D=distance between illuminator and prism

90-$\beta_0$=angle of sighting with the prism-illuminator axis $\tau_0$=D sin($\beta_0$)/C=delay applied to one of the reception channel for adjusting the focusing on $\beta_0$ The angular resolution is $\delta\beta$=C/BD. The average resolution on the ground is 0.15 km for D=100 km, B=27 MHz (L-band radiometry allocation), and a satellite altitude of 1000 km.

By choosing the range of value $\beta_0$ the intersection of the VLBI measurement cone with the earth creates a line globally transverse to the track. The geometry of the prism must be such that its long dimension projected along the line of sight also has a strong transverse component, conferring a beam whose footprint has a strong component along the track crossing the VLBI equal-measurement line at a large angle.

Imaging along the track is obtained by the displacement of the satellites, transverse imaging is obtained by the scanning of the prism beam. At the time of satellite displacement several sightings can be renewed on the same point (depth along the track) thanks to several $\beta_0$ values, with the object of accessing several incidences or for improving the radiometric resolution.

5.2 With a Prism Satellite 1 Extended Along the Pitch Axis

Figure 4:
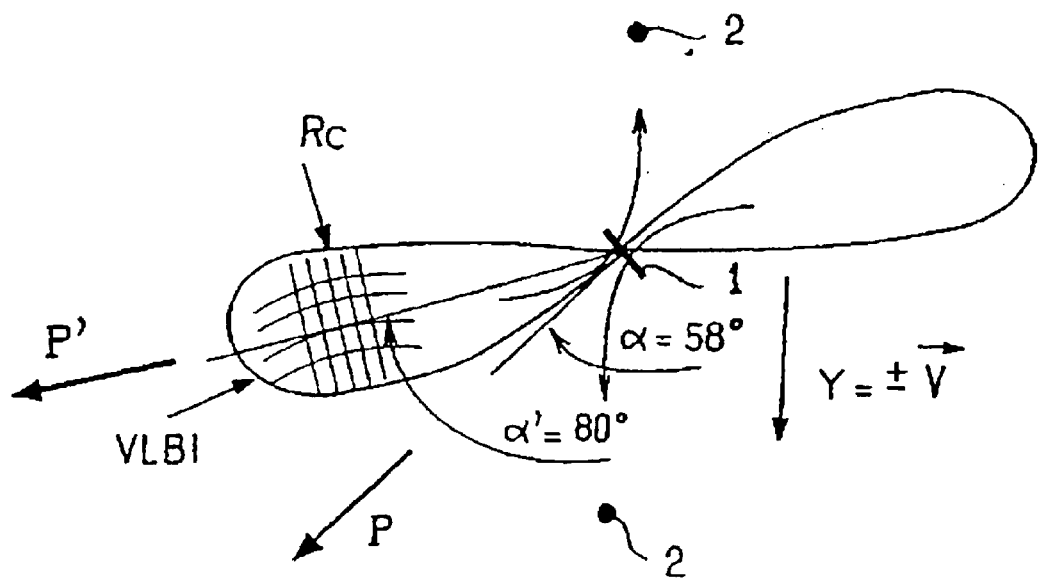
FIGS. 4 and 5 are a schematic representation of two imaging geometries in the case of a microwave imaging application.

As illustrated in FIG. 4, by taking the vector P in the plane of the orbit and inclined toward the earth, the self-compensation sighting cone meets the earth along a curved line that intersects the satellite track orthogonally. With a prism elongated along the pitch axis, the ground footprint of the beam is elongated along the track. Scanning displaces this footprint transversely, the other dimension of the prism being small, the self-compensation line remains despite its curvature within the large dimension of the beam footprint for any position of the latter. If the mission is only aimed at a simple swath without depth along the track, $\beta_0$ can be adjusted to the misalignment of the beam in order to maintain the pixel on the self-compensation line and the antenna deformation constraints are then totally relaxed. By limiting this relaxation to a factor of 10, we have a range from +/−10° for making the depth by multiple sightings in VLBI (which diverge from the self-compensation sighting).

5.3 With a Prism Satellite 1 of the Sail Type (Extended Along the Vertical Axis)

Figure 5:
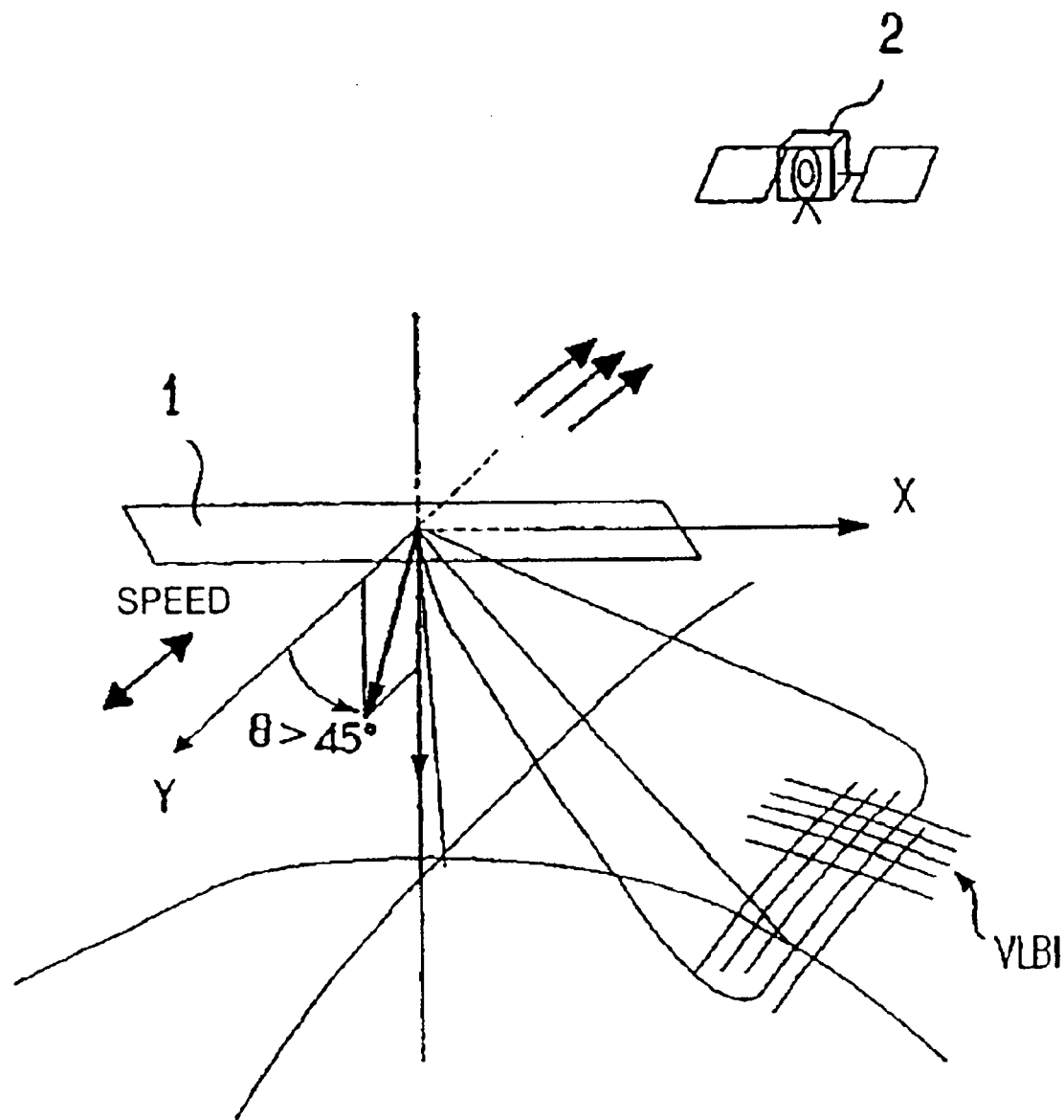

The SAIL type configuration is perfectly suited for an antenna elongated along the vertical. The sighting of each side of the track is possible at the price of a second illuminator satellite located on the other side with respect to the prism along the orbit and almost without changing anything on the prism. FIG. 5 represents the imaging geometry, seen by an observer located on the vertical axis along which the prism extends.

With a translation signal originating from the illuminators or a low value internal translation, an adjustment to the geometry can be obtained with an elevation sighting range of −45°+/−10°, $\alpha$=58° and $\alpha'$=80°.

In addition to the inherent suitability of the SAIL concept to a very vertically elongated antenna (gravity gradient) the other advantage compared to the previous configuration is the tolerance to array lobes enabling the antenna to be made lacunary in its large dimension in a ratio of 5 (2.5 $\lambda_f$ spacing of elements 0.5 $\lambda_f$ in size), an aspect that can be exploited to achieve multifrequency by placing other radiating elements in the holes. The drawback of this configuration is that the swing in elevation that transverse registration makes does not take place along the self-compensation line and is limited to +/−10° to keep a flatness relaxation of a factor of 10. This results for the same re-visit firstly in a need to fly at much higher altitude with an impact on the, length of the antenna, and secondly in the need for two illuminating microsatellites 2.

What is claimed is:

1. A system comprising a radio-frequency antenna placed in an orbit around the earth, and illuminating means for transmitting and/or receiving likewise orbiting around the earth located on at least a satellite separate from the one bearing the antenna, the antenna being located in the illuminating field of said means, characterized in that the antenna is a transmitting and/or receiving radiofrequency antenna formed of a mesh of tiles, this antenna comprising phase-shifting and/or delaying means connected to these tiles, the signals received by the tiles passing through the phase-shifting and/or delaying means before being retransmitted on said tiles, these phase-shifting and or delaying means being capable of diverting the radio-frequency signals corresponding to one or several channels transmitted by the illuminating means to send them back to the earth along one or several beams and/or of diverting the radio-frequency signals corresponding to one or several beams transmitted from the earth to send them back to the illuminating means along one or several channels.

2. The system according to claim 1, characterized in that the phase-shifting and/or delaying means are controlled so as to keep the orientation of a beam corresponding to a channel unchanged in the reference frame associated with the antenna in spite of modifications to the orientation of the illumination direction used by the beam in the reference frame associated with the antenna.

3. The system according to claim 2, characterized in that the phase-shifting and/or delaying means are controlled so as to keep the orientation unchanged in the reference frame associated with the antenna, of a possibly virtual beam direction corresponding to a possibly virtual illumination direction referenced with respect to the illumination directions of a channel.

4. The system according to claim 3, characterized in that the direction of the possibly virtual beam, on which the compensation bears is chosen so as to minimize the maximum angular difference between this beam and the beam or set of beams of the channel and in that the increment, measured at the wavelength of the central frequency of the earth side channel, between the central points used by the channel is established as a function of this maximum angular difference and the tolerable level of the sub-array lobes accompanying the channel beam or beams.

5. The system according to claim 3, characterized in that the referenced virtual illumination direction is that of an illuminating sub-assembly, which transmits the measurement signal, and in that the measurement immediately gives the information needed for compensation.

6. The system according to claim 2, characterized in that it includes means for controlling the phase-shifting and/or delaying means so as to keep the direction of at least one beam of at least one channel unchanged in the earth reference frame in spite of modifications in the attitude of the antenna and modifications that result therefrom concerning the orientation of illumination directions in the reference frame associated with the antenna.

7. The system according to claim 2, characterized in that the satellite bearing the antenna and at least one satellite bearing the illuminating means include means for determining the orientation of the illumination direction in the reference frame associated with the antenna.

8. The system according to claim 7, characterized in that the orientation of the illumination direction in the reference frame associated with the antenna is determined based on knowing the attitude of the antenna and the orientation of the axis joining them, in the earth reference frame.

9. The system according to claim 7, characterized in that the antenna includes means for comparing the phases and/or delays of at least one signal transmitted by the illuminating means and received at different points of the antenna and means for determining according to this comparison the orientation of the direction of arrival of the signal or signals, in the reference frame associated with the antenna.

10. The system according to claim 2, characterized in that the satellite bearing the antenna and at least one satellite bearing illuminating means include means for determining the orientation of the axis joining them, in the earth reference frame.

11. The system, according to claim 10, characterized in that the yaw and/or pitch attitude of the antenna is determined based on knowledge of the orientation in the antenna-related reference frame of the direction of arrival of the signal or signals and of the orientation in the earth reference frame of this arrival direction.

12. The system according to claim 10, characterized in that a satellite bearing illuminating means includes means for being located or means of receiving radiolocation signals, as well as means for transmitting the location information or the radiolocation signals that it receives to the satellite bearing the antenna, the latter including means for determining primarily according to this information the orientation of the axis joining the two satellites, in the earth reference frame.

13. The system according to claim 1, characterized in that the illuminating means are borne by at least one satellite substantially in the same orbit as the one bearing the antenna.

14. The system according to claim 13, characterized in that the orbit of the satellites is a low orbit and in that the antenna extends substantially in a plane that passes through the center of the earth, in that an offset of the plane in relation to the orbital plane enables illumination on one face, in that on the other face at least one of the beams is realigned to see the earth.

15. The system according to claim 14, characterized in that the phase shifts and delays are such that the offset of the illuminating sub-assemblies is expressed by beams with ground footprints offset transversely with respect to the track.

16. The system according to claim 13, characterized in that at least two antenna satellites use common illuminating means.

17. The system according to claim 16, characterized in that at least two antenna satellites are located on the same side, along the orbit, of the illuminating means, and in that they are offset on the same orbit or are offset in ellipticity and/or orbital plane.

18. The system according to claim 16, characterized in that at least two antenna satellites are on each side of the illuminating means.

19. The system according to claim 16, characterized in that one antenna satellite bears illuminating means for another antenna satellite.

20. The system according to claim 19, characterized in that one prism satellite bears illuminating means for another prism satellite and is illuminated by illuminating means borne by a prism satellite.

21. The system according to claim 13, characterized in that the axis normal to the antenna is substantially in the orbital plane, the pitch being such that the self-compensation sighting cone meets the earth along a self-compensation line globally stretching transversely to the orbit and in that the ground displacement, substantially along the projection of the orbit, of the line of self-compensation is created by the displacement of the satellite and/or by the change in pitch of the antenna axis and/or the change in translation frequency in the case where this is ensured at least by an internal signal, these three means being able to be used separately or in combination.

22. The system according to claim 21, characterized in that the ground sightings are spread in a swath along the line of self-compensation in such a way that the antenna's deformation constraints are very relaxed.

23. The system according to claim 22 taken in combination, characterized in that it includes means for performing ground sightings based on an electronic scan of a beam according to a monodimensional control and in that the large dimension of the beam footprint, which results from the small dimension of the antenna, is along the orbit and enables the coverage of the self-compensation line for all positions of the beam, in spite of the curvature of this line and the mono-dimensional nature of the scanning control.

24. The system according to claim 23, characterized in that the antenna is extended along the pitch axis.

25. The system according to claim 13, characterized in that illuminating means receive signals directly from the earth also received via the antenna and in that a correlation between the two incoming signal paths makes a sighting discrimination of the source of these signals as a function of the angle that the direction of arrival of the signals makes with the antenna/illuminating means axis.

26. The system according to claim 25, characterized in that the displacement on the ground, substantially along the orbit's projection, of the sighting zone discriminated by correlation is achieved by the displacement of the satellite and/or by changing tho angle of discrimination.

27. The system according to claim 26, characterized in that the antenna presents a larger dimension in one direction than in the other directions, which for at least one beam ensures the narrowness of the footprint on the ground in a direction transverse to the orbit.

28. The system according to claim 26 taken in combination, characterized in that ground imaging along two cross components is obtained by combining the correlation and a beam scan.

29. The system according to claim 28, characterized in that the antenna is extended along the yaw axis.

30. The system according to claim 28, characterized in that the antenna has means for measuring or reconstructing the deformation ($\Delta P$) transverse to the plane of the antenna.

31. The system according to claim 30, characterized in that the antenna includes means for comparing the phases and/or delays of at least one signal transmitted by the illuminating means and received at different points of the antenna and means for determining according to this comparison the deformation (ΔP) transverse to the plane of the antenna.

32. The system according to claim 1, characterized in that the radiofrequency antenna is substantially flat, the signals passing from one face to the other of said antenna and for at least one channel and in one path direction, it corresponds, to a direction of illumination along which the illuminating means transmit and/or receive signals to and from the antenna, a cone of self-compensation sightings to and from the earth defined by a common incidence on the plane of the antenna, called self-compensation incidence (the incidence of a direction being the angle that this direction makes with the normal to the plane of the antenna), the self-compensation sightings being such that the deformations of the antenna transverse to the general plane of the antenna and the attitude errors of the antenna about any axis contained within said plane are substantially without effect on these same signals diverted to or from this self-compensation sighting and of small effect in the neighboring sighting directions.

33. The system according to claim 32, characterized in that for an illumination direction of at least one channel along which illuminating means transmit and/or receive signals to and from the antenna and at least one path direction, the self-compensation incidence is equal to the incidence of the illumination direction.

34. The system according to claim 32, characterized in that for an illumination direction of at least one channel along which illuminating means transmit and/or receive signals to and from the antenna and at least one path direction, the cosine of the self-compensation sighting incidence and the cosine of the illumination direction incidence are substantially in the ratio of the central frequencies of the illumination side and earth side channel.

35. The system according to claim 32, characterized in that the attitude of the antenna is such that the angular difference between all the possible sightings and the self-compensation sightings are globally minimized.

36. The system according to claim 1, characterized in that each tile includes at least a central portion, unique for a given channel and a path direction, connected by grouping and/or splitting means upstream on the path at at least one signal receiving point and downstream at at least one signal transmitting point and in that means for applying phase-shifting and or delaying between the transmitting and receiving points for ensuring diversion are applied on the central portion with regard to the common delaying and phase-shifting and on the branches with regard to the differential delaying or phase-shifting.

37. The system according to claim 36, characterized in that it includes means enabling the phase-shifting and/or delays applied on the different paths to be varied.

38. The system according to claim 36, characterized in that at least a part of the connecting means between the receiving point or points and the transmission point or points is common to different channels and in that means enabling these different channels to be discriminated are disposed at the level of at least one junction between a portion of common path and portions of specific paths.

39. The system according to claim 38, characterized in that the delay on the central portion is common to at least two channels on at least one path direction.

40. The system according to claim 38, characterized in that the frequency translation is implemented, on at least one channel and one path, in the central portion.

41. The system according to claim 1, characterized in that the antenna includes means for translating the frequency of the signals at the time of their diversion, for at least one channel and one path.

42. The system according to claim 41, characterized in that for at least one channel and at least one path, the signals use a different frequency before and after the antenna and in that the translation frequency used does not originate from signals received on one of the faces of the tile.

43. The system according to claim 41, characterized in that along at least one channel and at least one path, the signals use a different frequency before and after the antenna and in that the translation frequency originates from an external translation signal received by a tile face.

44. The system according to claim 43, characterized in that the external translation signal used along at least one channel is transmitted by the illuminating means and received by the antenna face which is on the illumination side, and in that in the case where the illuminating means are split into illuminating sub-assemblies, the external translation signal is transmitted by a sub-assembly called a focus, possibly limited to this function.

45. The system according to claim 43, characterized in that an external translation signal used along at least one channel in receiving is received by the tile face along which receiving takes place and is transmitted from a ground point called ground focus.

46. The system according to claim 43, characterized in that an external translation signal used along at least one channel in receiving is received by the tile face along which receiving takes place and is transmitted by at least a satellite substantially in the same orbit as the antenna and the illuminating means, this satellite being arranged in relation to the antenna on the side opposite the illuminating means, the signal transmitting means being called opposite focus.

47. The system according to claim 43, characterized in that for at least one channel used in transmitting and in receiving, the frequency Fe is equal to the frequency F for both paths and at least one ground focus is in the neighborhood of a transmission self-compensation sighting corresponding to these illuminating means.

48. The system according to claim 43, characterized in that the attitude and the translation frequency or frequencies Fe or Fi are such that the angular difference between all the possible sightings and the self-compensation sightings are globally minimized.

49. The system according to claim 43, characterized in that the attitude and the translation frequency or frequencies Fe or Fi are such that the self-compensation residues are spread over both paths.

50. The system according to claim 41, characterized in that along at least one channel and at least one path, the signals use a different frequency before and after the antenna and in that the translation frequency results from or is equivalent to two consecutive translations, one of which is called external and whose translation frequency, termed Fe, originates from an external translation signal received by a tile face and the other of which is called internal and which is of translation frequency Fi, is without reference to a signal received by one or other of the tile faces.

51. The system according to claim 41, characterized in that the illuminating means comprise a plurality of illuminating sub-assemblies and in that, for a given channel for which the antenna implements a translation frequency, the different signals transmitted to the plurality of illuminating sub-assemblies or originating therefrom are divided along a plurality of transmitting and/or receiving beams toward the earth whose angular geometry seen from the antenna substantially corresponds to the relative angular geometry along which the different sub-assemblies illuminating this channel are seen from the antenna, after multiplication of all the angular differences by the ratio of the central frequencies of the illuminating side and earth side channel, this geometry being selectively modified by an anisotropy.

52. The system according to claim 51, characterized in that illuminating sub-assemblies are on the same satellite.

53. The system according to claim 41, characterized in that the antenna includes means for implementing different frequency translations on the radio-frequency signals transmitted or received along separate channels.

54. The system according to claim 41, characterized in that on a central portion delay, everything is routed to at least one channel and the translation line, or a reference enabling it to be created, used for reducing the frequency of the channel or channels downstream of the delay, so as to limit the impact of delay imperfections on the phase of the diverted signal.

55. The system according to claim 41, characterized in that a downlink translation is implemented on one channel or several channels upstream of the central portion delay.

56. The system according to claim 55, characterized in that such a downlink translation is followed by an uplink translation after the delay using a reference not having suffered this delay, so as to limit the impact of delay imperfections on the phase of the diverted signal.

57. The system according to claim 1, characterized in that for at least one channel and at least one path, the signals use the same frequency before and after the antenna.

58. The system according to claim 57, characterized in that the illuminating means comprise a plurality of illuminating sub-assemblies and in that different signals from the same channel transmitted to the plurality of illuminating sub-assemblies or originating therefrom are divided between the earth and the antenna along a plurality of transmitting and/or receiving beams whose angular geometry seen from the antenna substantially corresponds to the relative angular geometry along which the different sub-assemblies illuminating this channel are seen from the antenna, this geometry being modified by an anisotropy where necessary.

59. The system according to claim 58, characterized in that illuminating sub-assemblies are offset from one another in a common orbit.

60. The system according to claim 58, characterized in that orbits of illuminating sub-assemblies have differences in ellipticity and/or orbital plane.

61. The system according to claim 58, characterized in that, in one telecommunications transmission application, it comprises a plurality of channels, together with a plurality of illuminating sub-assemblies, the beam mosaic on the ground consisting of the fine pattern generated by the antenna due to the angular geometry along which the illuminating sub-assemblies are seen by it, repeated along a wide pattern that is generated by the antenna due to the different channels.

62. The system according to claim 61, characterized in that the illuminating sub-assemblies illuminating the same channel are seen from the antenna according to a relatively stable angular geometry except for a rotation about itself at the orbital period and in that the plurality of directions ensured by the wide pattern of the channel precesses thanks to the phase-shifting and/or delaying means around a central direction and this in phase with the rotation of the fine pattern so that the mosaic of all the beams keeps a stable structure, apart from a rotation about itself on the orbital scale.

63. A system comprising a radio-frequency antenna placed in an orbit around the earth, and illuminating means for transmitting and/or receiving likewise orbiting around the earth located on at least a satellite separate from the one bearing the antenna, the antenna being located in the illuminating field of said means, characterized in that the antenna is a transmitting and/or receiving radiofrequency antenna formed of a mesh of tiles, this antenna comprising phase-shifting and/or delaying means connected to these tiles, the signals received by the tiles passing through the phase-shifting and/or delaying means before being retransmitted on said tiles, these phase-shifting and or delaying means being capable of diverting the radio-frequency signals corresponding to one or several channels transmitted by the illuminating means to send them back to the earth along one or several beams and/or of diverting the radio-frequency signal corresponding to one or several beams transmitted from the earth to send them back to the illuminating means alone one or several channels;

characterized in that the radiofrequency antenna is substantially flat, the signals passing from one face to the other of said antenna and for at least one channel and in one path direction, it corresponds, to a direction of illumination along which the illuminating means transmit and/or receive signals to and from the antenna, a cone of self-compensation sightings to and from the earth defined by a common incidence on the plane of the antenna, called self-compensation incidence (the incidence of a direction being the angle that this direction makes with the normal to the plane of the antenna), the self-compensation sightings being such that the deformations of the antenna transverse to the general plane of the antenna and the attitude errors of the antenna about any axis contained within said plane are substantially without effect on these same signals diverted to or from this self-compensation sighting and of small effect in the neighboring sighting directions; and wherein, for an illumination direction of at least one channel, along which illuminating means transmit signals to the antenna while transmitting the external translation signal, the cosine of the self-compensation incidence and the cosine of the illumination direction incidence are substantially in the ratio (f+F−Fe)/f where f is the earth side frequency, Fe is the value of the external translation, and F is the total frequency translation, and in that in the case where the illuminating means are split into sub-assemblies, the difference in incidence between the illumination in question and the focus is substantially reproduced in the difference between the self-compensation incidences corresponding to the illumination and those that would correspond to the focus, using the multiplying terms (f+F/f) and (sin($\Phi$1)/sin($\Phi$2) where $\Phi$1 is the illumination incidence angle of the focus and $\Phi$2 the self-compensation incidence angle that would result if the focus transmitted.

64. The system according to claim 63, characterized in that Fe and F are of the same sign, i.e. relate to changes of frequency in the saint direction.

65. The system according to claim 64, characterized in that for at least one channel used in transmitting and receiving, the attitude of the antenna, as well as the frequencies Fi and Fe both in transmission and reception, are such that the self-compensation sightings are identical on both paths despite the non-alignment of the opposite focus with the illuminating means used in receiving, or in spite of the distance between the ground focus and the center of the zone to be covered.

66. The system according to claim 64, characterized in that, for at least one channel used in transmitting and receiving, |Fe|=|F| and Fi|=2|F| for receiving and Fe=F for transmitting and in that the self-compensation sightings are substantially the same on both paths.

67. A system comprising a radio-frequency antenna placed in an orbit around the earth, and illuminating means for transmitting and/or receiving likewise orbiting around the earth located on at least a satellite separate from the one bearing the antenna, the antenna being located in the illuminating field of said means, characterized in that the antenna is a transmitting and/or receiving radiofrequency antenna formed of a mesh of tile, this antenna comprising phase-shifting and/or delaying means connected to these tiles, the signal received by the tiles passing through the phase-shifting and/or delaying means before being retransmitted on said tiles, these phase-shifting and or delaying means being capable of diverting the radio-frequency signals corresponding to one or several channels transmitted by the illuminating means to send them back to the earth along one or several beams and/or of diverting the radio-frequency signals corresponding to one or several beams transmitted from the earth to send them back to the illuminating means along one or several channels;

the radiofrequency antenna is substantially flat, the signals passing from one face to the other of said antenna and for at least one channel and in one path direction, it corresponds, to a direction of illumination along which the illuminating means transmit and/or receive signals to and from the antenna, a cone of self-compensation sightings to and from the earth defined by a common incidence on the plane of the antenna, called self-compensation incidence (the incidence of a direction being the angle that this direction makes with the normal to the plane of the antenna), the self-compensation sightings being such that the deformations of the antenna transverse to the general plane of the antenna and the attitude errors of the antenna about any axis contained within said plane are substantially without effect on these same signals diverted to or from this self-compensation sighting and of small effect in the neighboring sighting directions;

the antenna includes means for translating the frequency of the signals at the time of their diversion, for at least one channel and one path;

along at least one channel and at least one path, the signals use a different frequency before and after the antenna and in that the translation frequency originates from an external translation signal received by a tile face;

an external translation signal used along at least one channel in receiving is received by the tile face along which receiving takes place and is transmitted from a ground point called ground focus; and wherein for an illumination direction of at least one channel, along which illuminating means receive signals the self-compensation incidence angle is substantially equal to $\Phi 2+(\cos(\Phi 2)(f+Fe)-\cos(\Phi 1)(F+f))/\sin(\Phi 2)f$ where $\Phi 1$ and $\Phi 2$ are the angle of incidence of the illumination direction and that of the external translation signal, f the earth side frequency, Fe is the external translation value, and F is the total frequency translation.

68. The system according to claim 67, characterized in that Fe and F are of the same sign, i.e. relate to changes of frequency in the same direction.

69. A system comprising a radio-frequency antenna placed in an orbit around the earth, and illuminating means for transmitting and/or receiving likewise orbiting around the earth located on at least a satellite separated from the one bearing the antenna, the antenna being located in the illuminating field of said means, characterized in that the antenna is a transmitting and/or receiving radiofrequency antenna formed of a mesh of tiles, this antenna comprising phase-shifting and/or delaying means connected to these tiles, the signals received by the tiles passing through the phase-shifting and/or delaying means before being retransmitted on said tiles, these phase-shifting and or delaying means being capable of diverting the radio-frequency signals corresponding to one or several channels transmitted by the illuminating means to send them back to the earth alone one or several beams and/or of diverting the radio-frequency signals corresponding to one or several beams transmitted from the earth to send them back to the illuminating means alone one or several channels; and the radiofrequency antenna is substantially flat, the signals passings from one face to the other of said antenna and for at least one channel and in one path direction, it corresponds, to a direction of illumination along which the illuminating means transmit and/or receive signals to and from the antenna, a cone of self-compensation sightings to and from the earth defined by a common incidence on the plane of the antenna, called self-compensation incidence (the incidence of a direction being the angle that this direction makes with the normal to the plane of the antenna), the self-compensation sightings being such that the deformations of the antenna transverse to the general plane of the antenna and the attitude errors of the antenna about any axis contained within said plane are substantially without effect on these same signals diverted to or from this self-compensation sighting and of small effect in the neighboring sighting directions;

wherein, for an illumination direction of at least one channel, along which illuminating means receive signals, the translation of frequency Fe is done from the external signal received by the illumination face and the self-compensation incidence is such that cosine $(\Phi 2)/\text{cosine}(\Phi 1)=(f+Fe+F)/f$ where $\Phi 1$ and $\Phi 2$ are the angle of incidence of the illumination direction and the angle of incidence of self-compensation, f being the earth side frequency, Fe the value of the external translation, F the total frequency translation.

70. The system according to claim 69, characterized in that Fe and F are of opposite signs, i.e. the external translation Fe is opposite in direction to the total translation F.

71. The system according to claim 70, characterized in that for at least one channel used in receiving |Fe|=|F| and |Fi=2|F|.

72. A system comprising a radio-frequency antenna placed in an orbit around the earth, and illuminating means for transmitting and/or receiving likewise orbiting around the earth located on at least a satellite separate from the one bearing the antenna, the antenna being located in the illuminating field of said means, characterized in that the antenna is a transmitting and/or receiving radiofrequency antenna formed of a mesh of tiles, this antenna comprising phase-shifting and/or delaying means connected to these tiles, the signals received by the tiles passing through the phase-shifting and/or delaying means before being retransmitted on said tiles, these phase-shifting and or delaying means being capable of diverting the radio-frequency signals corresponding to one or several channels transmitted by the illuminating means to send them back to the earth alone one or several beams and/or of diverting the radio-frequency signals corresponding to one or several beams transmitted from the earth to send them back to the illuminating means alone one or several channels;

the radiofrequency antenna is substantially flat, the signals passing from one face to the other of said antenna and for at least one channel and in one path direction, it corresponds, to a direction of illumination alone which the illuminating means transmit and/or receive signals to and from the antenna, a cone of self-compensation sightings to and from the earth defined by a common incidence on the plane of the antenna, called self-compensation incidence (the incidence of a direction being the angle that this direction makes with the normal to the plane of the antenna), the self-compensation sightings being such that the deformations of the antenna transverse to the general plane of the antenna and the attitude errors of the antenna about any axis contained within said plane are substantially without effect on these same signals diverted to or from this self-compensation sighting and of small effect in the neighboring sighting directions; and wherein, for an illumination direction of at least one channel, along which illuminating means receive signals, the translation Fe is done from the external signal received by the illumination face and is of the same direction as the total translation F, in that F=Fe and in that the self-compensation incidence is give by $\Phi 2-\Phi 1=-2\cot(\Phi 1)F/f$ where $\Phi 1$ and $\Phi 2$ are the angle of incidence of the illumination direction and the angle of incidence of self-compensation, f being the earth side frequency, Fe the value of the translation, F the total frequency translation.

73. A system comprising a radio-frequency antenna placed in an orbit around the earth, and illuminating means for transmitting and/or receiving likewise orbiting around the earth located on at least a satellite separate from the one bearing the antenna, the antenna being located in the illuminating field of said means, characterized in that the antenna is a transmitting and/or receiving radiofrequency antenna formed of a mesh of tiles, this antenna comprising phase-shifting and/or delaying means connected to these tiles, the signals received by the tiles passing through the phase-shifting and/or delaying means before being retransmitted on said tiles, these phase-shifting and or delaying means being capable of diverting the radio-frequency signal corresponding to one or several channels transmitted by the illuminating means to send them back to the earth along one or several beams and/or of diverting the radio-frequency signals corresponding to one or several beams transmitted from the earth to send them back to the illuminating means alone one or several channels;

the radiofrequency antenna is substantially flat, the signals passing from one face to the other of said antenna and for at least one channel and in one path direction, it corresponds, to a direction of illumination along which the illuminating means transmit and/or receive signals to and from the antenna, a cone of self-compensation sightings to and from the earth defined by a common incidence on the plane of the antenna, called self-compensation incidence (the incidence of a direction being the angle that this direction makes with the normal to the plane of the antenna), the self-compensation sightings being such that the deformations of the antenna transverse to the general plane of the antenna and the attitude errors of the antenna about any axis contained within said plane are substantially without effect on these same signals diverted to or from this self-compensation sighting and of small effect in the neighboring sighting directions; and wherein, for an illumination direction of at least one channel along which illuminating means transmit and/or receive signals to and from the antenna and at least one path direction, a deformation correction is made by variation of the phase-shift value $\Delta P$ $(2\pi f/C)(\cos(\Phi 2)-\cos(\Phi 1))$ in at least one of the central portions, where $\Phi 1$ is the angle of incidence of illumination, $\Phi 2$ is that of the sighting direction, f is the earth side and illumination side frequency, and $\Delta P$ is the transverse deformation value at each of the central portions.

74. A system comprising radio-frequency antenna placed in an orbit around the earth, and illuminating mean for transmitting and/or receiving likewise orbiting around the earth located on at least a satellite separate from the one bearing the antenna, the antenna being located in the illuminating field of said means, characterized in that the antenna is a transmitting and/or receiving radiofrequency antenna formed of a mesh of tiles, this antenna comprising phase-shifting and/or delaying means connected to these tiles, the signals received by the tiles passing through the phase-shifting and/or delaying means before being retransmitted on said tiles, these phase-shifting and or delaying means being capable of diverting the radio-frequency signals corresponding to one or several channels transmitted by the illuminating means to send them back to the earth along one or several beams and/or of diverting the radio-frequency signals corresponding to one or several beams transmitted from the earth to send them back to the illuminating means along one or several channels;

the radiofrequency antenna is substantially flat, the signals passing from one face to the other of said antenna and for at least one channel and in one path direction, it corresponds, to a direction of illumination along which the illuminating means transmit and/or receive signals to and from the antenna, a cone of self-compensation sightings to and from the earth defined by a common incidence on the plane of the antenna, called self-compensation incidence (the incidence of a direction being the angle that this direction makes with the normal to the plane of the antenna), the self-compensation sighting being such that the deformations of the antenna transverse to the general plane of the antenna and the attitude errors of the antenna about any axis contained within said plane are substantially without effect on those same signals diverted to or from this self-compensation sighting and of small effect in the neighboring sighting directions; and wherein, for an illumination direction of at least one channel along which illuminating means transmit and/or receive signals to and from the antenna and at least one path direction, a deformation correction is made by variation of the phase-shift of value $\Delta P$ $(2\pi f/C)-f1$ $(\cos(\phi 2)-\cos(\Phi 1))$ in at least one of the central portions, where $\Phi 1$ is the angle of incidence of illumination, $\Phi 2$ is that of the sighting direction, f2 and f1 are the earth side and illumination side frequencies, and πP is the transverse deformation value at each of the central portions.

75. A system comprising a radio-frequency antenna placed in an orbit around the earth, and illuminating means for transmitting and/or receiving likewise orbiting around the earth located on at least a satellite separate from the one bearing the antenna, the antenna being located in the illuminating field of said means, characterized in that the antenna is a transmitting and/or receiving radiofrequency antenna formed of a mesh of tiles, this antenna comprising phase-shifting and/or delaying means connected to these tiles, the signals received by the tiles passing through the phase-shifting and/or delaying means before being retransmitted on said tiles, these phase-shifting and or delaying means being capable of diverting the radio-frequency signals corresponding to one or several channels transmitted by the illuminating means to send them back to the earth along one or several beams and/or of diverting the radio-frequency signals corresponding to one or several beams transmitted from the earth to send them back to the illuminating means along one or several channels;

the radiofrequency antenna is substantially flat, the signals passing from one face to the other of said antenna and for at least one channel and in one path direction, it corresponds, to a direction of illumination along which the illuminating means transmit and/or receive signals to and from the antenna, a cone of self-compensation sightings to and from the earth defined by a common incidence on the plane of the antenna, called self-compensation incidence (the incidence of a direction being the angle that this direction makes with the normal to the plane of the antenna), the self-compensation sightings being such that the deformations of the antenna transverse to the general plane of the antenna and the attitude errors of the antenna about any axis contained within said plane are substantially without effect on these same signals diverted to or from this self-compensation sighting and of small effect in the neighboring sighting directions; and wherein, for an illumination direction of at least one channel, along which illuminating means transmit signals to the antenna, a deformation correction is made by variation of the phase-shift of $\Delta P$ $(2\pi/C)(f \cos(\Phi 2)-(f+F)\cos(\Phi 1)+Fe \cos(\Phi 1))$ in at least one of the central portions, where f is the earth side frequency, Fe is the measured external translation value of the same sign as F if the frequency changes are in the same direction, F is the total frequency translation, $\Phi 1$ is the angle of incidence of illumination, $\Phi 2$ is that of the sighting direction, $\Phi 1$ is that of the focus direction, $\Delta P$ is the transverse deformation value at each of the central portions.

76. A system comprising a radio-frequency antenna placed in an orbit around the earth, and illuminating means for transmitting and/or receiving likewise orbiting around the earth located on at least a satellite separate from the one bearing the antenna, the antenna being located in the illuminating field of said means, characterized in that the antenna is a transmitting and/or receiving radiofrequency antenna formed of a mesh of tiles, this antenna comprising phase-shifting and/or delaying means connected to these tiles, the signals received by the tiles passing through the phase-shifting and/or delaying means before being retransmitted on said tiles, these phase-shifting and or delaying means being capable of diverting the radio-frequency signals corresponding to one or several channels transmitted by the illuminating means to send them back to the earth along one or several beams and/or of diverting the radio-frequency signals corresponding to one or several beams transmitted from the earth to send them back to the illuminating means along one or several channels;

the radiofrequency antenna is substantially flat, the signals passing from one face to the other of said antenna and for at least one channel and in one path direction, it corresponds, to a direction of illumination along which the illuminating means transmit and/or receive signals to and from the antenna, a cone of self-compensation sightings to and from the earth defined by a common incidence on the plane of the antenna, called self-compensation incidence (the incidence of a direction being the angle that this direction makes with the normal to the plane of the antenna), the self-compensation sightings being such that the deformations of the antenna transverse to the general plane of the antenna and the attitude errors of the antenna about any axis contained within said plane are substantially without effect on these same signals diverted to or from this self-compensation sighting and of small effect in the neighboring sighting directions; and wherein, for an illumination direction of at least one channel, along which illuminating means receive signals, a deformation correction is made in at least one of the central portions by variation of the phase-shift of $\Delta P$ $(2\pi/C)(f \cos(\Phi 2)-(f+F)\cos(\Phi 1)-Fe \cos(\Phi 1))$, where f is the earth side frequency, Fe is the measured external translation value of the same sign as F if the frequency changes are in the same direction, F is the total frequency translation, $\Phi 1$ is the angle of incidence of illumination, $\Phi 2$ is that of the sighting direction, $\Phi 1$ is that of the focus direction and $\Delta P$ is the transverse deformation value at each of the central portions.

77. A system comprising a radio-frequency antenna placed in an orbit around the earth, and illuminating means for transmitting and/or receiving likewise orbiting around the earth located on at least a satellite separate from the one bearing the antenna, the antenna being located in the illuminating field of said means, characterized in that the antenna is a transmitting and/or receiving radiofrequency antenna formed of a mesh of tiles, this antenna comprising phase-shifting and/or delaying means connected to these tiles, the signals received by the tiles passing through the phase-shifting and/or delaying means before being retransmitted on said tiles, these phase-sifting and or delaying means being capable of diverting the radio-frequency signals corresponding to one or several channels transmitted by the illuminating means to send them back to the earth along one or several beams and/or of diverting the radio-frequency signals corresponding to one or several beams transmitted from the earth to send them back to the illuminating means along one or several channels;

the radiofrequency antenna is substantially flat, the signals passing from one face to the other of said antenna and for at least one channel and in one path direction, it corresponds, to a direction of illumination along which the illuminating means transmit and/or receive signals to and from the antenna, a cone of self-compensation sightings to and from the earth defined by a common incidence on the plane of the antenna, called self-compensation incidence (the incidence of a direction being the angle that this direction makes with the normal to the plane of the antenna), the self-compensation sightings being such that the deformations of the antenna transverse to the general plane of the antenna and the attitude errors of the antenna about any axis contained within said plane are substantially without effect on these same signals diverted to or from this self-compensation sighting and of small effect in the neighboring sighting directions; and wherein, for an illumination direction of at least one channel, along which illuminating means receive signals, a deformation correction is made in at least one of the central portions by variation of the phase-shift of $\Delta P$ $(2\pi/C)(f \cos(\Phi 2)+Fe \cos(\Phi 2)-(f+F)\cos(\Phi 1))$ where f is the earth side frequency, Fe is the measured external translation value of the same sign as F if the frequency changes are in the same direction, F is the total frequency translation, $\Phi 1$ is the angle of incidence of illumination, $\Phi 2$ is that of the sighting direction, $\Phi 2$ is that of the ground focus or opposite focus direction and $\Delta P$ is the transverse deformation value at each of the central portions.

* * * * *